(12) United States Patent
Gross et al.

(10) Patent No.: US 12,446,588 B2
(45) Date of Patent: Oct. 21, 2025

(54) TRIMMING DEVICE, TRIMMING SYSTEM AND METHOD

(71) Applicants: MAJA-MASCHINENFABRIK HERMANN SCHILL GMBH, Kehl (DE); MAREL INC., Des Moines, IA (US)

(72) Inventors: Joseph A. Gross, Offenburg (DE); Samuel R. McCarthy, Des Moines, IA (US); Darin Dostal, Simpsonville, SC (US); Ryan Rohe, Prole, IA (US); Gregory Anderson, Des Moines, IA (US); Douglas R. Bauer, Altoona, IA (US); William Johnson, Prairie City, IA (US)

(73) Assignees: MAJA-MASCHINENFABRIK HERMANN SCHILL GMBH, Kehl (DE); MAREL INC., Des Moines, IA (US)

( * ) Notice: Subject to any disclaimer, the term of this patent is extended or adjusted under 35 U.S.C. 154(b) by 0 days.

(21) Appl. No.: 18/841,535

(22) PCT Filed: Feb. 3, 2023

(86) PCT No.: PCT/EP2023/052632
§ 371 (c)(1),
(2) Date: Aug. 26, 2024

(87) PCT Pub. No.: WO2023/165779
PCT Pub. Date: Sep. 7, 2023

(65) Prior Publication Data
US 2025/0160344 A1    May 22, 2025

(30) Foreign Application Priority Data

Mar. 4, 2022    (EP) ..................................... 22160309

(51) Int. Cl.
*A22B 5/00* (2006.01)
*A22B 5/16* (2006.01)
*A22C 17/00* (2006.01)

(52) U.S. Cl.
CPC ............ *A22B 5/16* (2013.01); *A22C 17/0073* (2013.01)

(58) Field of Classification Search
CPC ........ A22B 5/16; A22B 5/166; A22C 17/0073
(Continued)

(56) References Cited

U.S. PATENT DOCUMENTS

| 4,947,517 A | 8/1990 | Boekel |
| 5,738,577 A | 4/1998 | Long |
| 8,986,080 B2 | 3/2015 | Black et al. |

FOREIGN PATENT DOCUMENTS

| DE | 2230943 B1 | 11/1973 |
| WO | 0178515 A1 | 10/2001 |
| WO | 2004106020 A1 | 12/2004 |

OTHER PUBLICATIONS

Extended European Search Report from corresponding European Patent Application No. EP22160309.5, Sep. 2, 2022.
(Continued)

*Primary Examiner* — Richard T Price, Jr.
(74) *Attorney, Agent, or Firm* — Workman Nydegger

(57) ABSTRACT

A trimming device for trimming a carcass part having a skin and/or fat side, including a blade having a cutting edge facing a front face of the carcass part, and a blade holder for holding the blade. The blade holder has a tiltable blade holder segment and a non-tiltable blade holder segment rotatably coupled to the non-tiltable blade holder segment around an axis of rotation parallel to a conveying direction along which the carcass part is transported to the trimming device, and an actuator configured to tilt the tiltable blade holder segment relative to the non-tiltable blade holder
(Continued)

segment based on information concerning a profile of the skin and/or fat side. A geometry of the cutting edge changes when the tiltable blade holder segment is tilted relative to the non-tiltable blade holder segment by the actuator to trim the skin and/or fat side into a predetermined shape.

16 Claims, 20 Drawing Sheets

(58) Field of Classification Search
USPC .......................................................... 452/127
See application file for complete search history.

(56) References Cited

OTHER PUBLICATIONS

International Search Report from corresponding PCT Application No. PCT/EP2023/052632, Apr. 21, 2023.

TRIMMING DEVICE, TRIMMING SYSTEM AND METHOD

BACKGROUND

The present invention relates to a trimming device for trimming a carcass part having a skin and/or fat side, a trimming system comprising such a trimming device and a method for trimming a carcass part having a skin and/or fat side by means of such a trimming device.

Pork loins are a high value product that comes in a wide variation of shapes and sizes. Such a loin has a skin and/or fat side comprising skin and a fat layer covered by the skin. To process loins of that kind, it is necessary to remove the skin and parts of the fat layer. To achieve a high throughput, it is desirable to remove the skin and parts of the fat layer in an automated process. Due to the curved shape of the loins, most existing solutions use a curved blade clamp with a blade to contour the shape of the loin. However, this curvature of the blade is fixed such that any loin deviating from the shape of the blade will not be trimmed accurately. Furthermore, the width of the loins varies not just from loin to loin but within a single loin. As a result, there is a compromise on most pieces trimmed on existing solutions with either too much or too little fat being removed. This leads to diminished product value or the need for additional downstream labor to achieve the customer's specifications.

U.S. Pat. No. 5,738,577 A describes an upper conveyor and trimming blade assembly for an automatic trimmer adapted for trimming a layer of material, conforming with the shape of a trimming blade, from a meat product. The assembly includes an upper conveyor mounted in a vertically spaced relation above a lower conveyer, wherein cooperative movement of the upper and lower conveyor is operative to transport the meat product into trimming engagement with a trimming blade. The trimming blade is mounted on the skinning machine base frame, for trimming the unwanted material from the meat product. The trimming blade is mounted in a holder adapted to bend the blade into a shape conforming with the shape of the meat product being trimmed.

SUMMARY

It is one object of the present invention to provide an improved trimming device for trimming a carcass part having a skin and/or fat side.

Accordingly, a trimming device for trimming a carcass part having a skin and/or fat side is provided. The trimming device comprises a blade having a cutting edge facing a front face of the carcass part, a blade holder for holding the blade, wherein the blade holder comprises a tiltable blade holder segment and a non-tiltable blade holder segment, wherein the tiltable blade holder segment is rotatably coupled to the non-tiltable blade holder segment around an axis of rotation, wherein the axis of rotation is oriented parallel to a conveying direction along which the carcass part is transported to the trimming device, and an actuator that is configured to tilt the tiltable blade holder segment relative to the non-tiltable blade holder segment based on information concerning a profile of the skin and/or fat side, wherein a geometry of the cutting edge changes when the tiltable blade holder segment is tilted relative to the non-tiltable blade holder segment by means of the actuator to trim the skin and/or fat side into a predetermined shape.

Since the blade holder has a tiltable blade holder segment, it is possible to change the geometry of the blade and the cutting edge according to an individual shape of the carcass part. It is thus manageable to improve the process results for carcass parts with irregular shapes.

The carcass part is part of an animal. For example, the carcass part is pork, beef, or lamb. Preferably, the carcass part is pork. The carcass part may be a loin, in particular a pork loin. Thus, the carcass part may also be referred to as "loin" in the following. The trimming device may thus also be referred to as "loin trimming device". The carcass part has a fat layer that is covered by skin. However, the skin can already be removed from the fat layer before processing the carcass part by means of the trimming device. The fat layer and the skin together form the skin and/or fat side of the carcass part. The carcass part also has a lean meat layer that is at least partly covered by the fat layer and the skin. The carcass part has a length direction and a width direction. The skin and/or fat side has a side profile that runs along the length direction. The side profile marks an interface between the skin and/or fat side and the lean meat layer.

The blade is elongated and can have a continuous shape. Thus, the blade can be named continuous blade. "Continuous" in this context means that the blade is not segmented or interrupted but has a band-shaped or ledge-shaped geometry. The blade can be deformed elastically. "Elastically" in this context means that the blade can be deformed from an unbent state into a bent state and back without any permanent deformation or damage. Thus, the blade can be deformed like a leaf spring. The blade has the sharp cutting edge and a blunt blade back that faces away from the cutting edge. The cutting edge faces the front face of the carcass part. The cutting edge is designed to cut through the fat layer of the carcass part.

Alternatively, the blade can be segmented or discontinuous. Thus, the blade can be named segmented blade or discontinuous blade. "Segmented" or "discontinuous" in this context means that the blade comprises a plurality of blade segments. The blade segments are preferably not connected to each other. However, this does not exclude that the blade segments are in contact with each other or touch each other. Each blade segment comprises a blade segment cutting edge. All blade segment cutting edges together form the cutting edge of the blade. In the case of a segmented blade, the blade segments themselves are not deformed or bent.

In the case that the blade is segmented, a trimming device for trimming a carcass part having a skin and/or fat side is provided. The trimming device then can comprise a segmented blade comprising a plurality of blade segments, wherein the blade segments together form a cutting edge of the blade facing a front face of the carcass part, a blade holder for holding the blade, wherein the blade holder comprises a tiltable blade holder segment and a fixed blade holder segment, wherein the tiltable blade holder segment is rotatably coupled to the fixed blade holder segment around an axis of rotation, wherein each blade holder segment holds one of the blade segments, and an actuator that is configured to tilt the tiltable blade holder segment relative to the fixed blade holder segment based on information concerning a profile of the skin and/or fat side, wherein a geometry of the cutting edge changes when the tiltable blade holder segment is tilted relative to the fixed blade holder segment by means of the actuator to trim the skin and/or fat side into a predetermined shape.

"Changing the geometry" of the cutting edge in this context can be understood that a bending or curvature of the cutting edge can be altered or amended by tilting the tiltable blade holder segment in relation to the non-tiltable blade holder segment. With the continuous blade, the change in geometry is done by elastically deforming the blade. This is done by tilting the tiltable blade holder segment relative to the non-tiltable blade holder segment. With the segmented blade, the change in geometry is done by tilting the blade segments relative to one another. This is also done by tilting the tiltable blade holder segment relative to the non-tiltable blade holder segment. Hence, the blade segments themselves are not deformed.

The blade holder is designed for holding the blade. "Holding" in this context includes that the blade segments or the blade is fixedly attached to the blade holder as well as that the blade segments or the blade can be dismantled from the blade holder. For example, the blade can be clamped, riveted, screwed, glued, welded, or soldered to the blade holder. However, the blade preferably is exchangeable. This enables easy maintenance of the trimming device.

The blade holder comprises an arbitrary number of tiltable blade holder segments. "Tiltable" in this context means that the tiltable blade holder segments can be rotated or pivoted around the axis of rotation, a bolt, or the like from an initial or untilted position into a tilted position and vice versa. The untilted position can also be named non-tilted position. There can be provided four, six, eight, ten or even more than ten tiltable blade holder segments. In the untilted position, an inclination angle between the blade holder segments is 180°.

"Non-tiltable" or "untiltable" in this context means that the non-tiltable blade holder segment cannot be tilted or pivoted in relation to the tiltable blade holder segment. However, "non-tiltable" does not exclude that the non-tiltable blade holder segment can be moved laterally along different spatial directions. "Non-tiltable" does also not exclude that the non-tiltable blade holder segment can be tilted or rotated together with the tiltable blade holder segment. In other words, the blade holder itself can be tilted or rotated. Thus, in its narrowest interpretation "non-tiltable" in context with the non-tiltable blade holder segment means that the non-tiltable blade holder segment cannot be rotated or tilted in relation to any of a plurality of tiltable blade holder segments. The term "non-tiltable" can be replaced by the terms "non-rotatable", "non-pivotable" or "non-swivelable".

The term "non-tiltable" can also be replaced by the terms "fixed" or "attached". Thus, the non-tiltable blade holder segment can be named fixed blade holder segment or attached blade holder segment. "Fixed" or "attached" in this context have the same meaning as "non-tiltable". In other words, the tiltable blade holder segment can be tilted or rotated in relation to the fixed blade holder segment, whereas the fixed blade holder segment itself cannot be rotated or tilted in relation to any of the tiltable blade holder segments. "Fixed" does not exclude that the fixed blade holder segment can be moved laterally along the different spatial directions. "Fixed" does also not exclude that the fixed blade holder segment can be tilted or rotated together with the tiltable blade holder segment.

The actuator is preferably an electric motor. In particular, the actuator can be a servo motor. The number of actuators is arbitrary. Preferably, at least two actuators are provided. The actuator can be controlled by means of a controller which processes the information concerning the profile of the skin and/or fat side to control the actuator. The "profile" in this context can comprise a three-dimensional geometry of a surface of the skin and/or fat side, a geometry of the side profile along the length direction of the carcass part, a thickness of the fat layer and/or a thickness of the skin seen in the length direction as well as in the width direction of the carcass part.

The tiltable blade holder segment changes the geometry of the cutting edge of the blade when the tiltable blade holder segment is actuated or tilted by means of the actuator. The tiltable blade holder segment holds the blade so that the cutting edge can for example be deformed when the tiltable blade holder segment is tilted or rotated. Trimming the skin and/or fat side into the "predetermined shape" in this context means that the skin and a part of the fat layer are cut away to provide the carcass part with a fat layer of a defined thickness. The predetermined shape can be part of a customer specification for the processed carcass part.

The conveying direction is defined as a direction along which the carcass part is transported to the trimming device. "Parallel" in this context means that there is an angle of preferably 0°±10°, more preferably of 0°±5°, more preferably of 0°±3°, more preferably of 0°±1°, more preferably of exactly 0°, between the axis of rotation and the conveying direction. Alternatively, the orientation of the axis of rotation can be defined as being oriented perpendicular to the cutting edge of the blade. "Perpendicular" in this context can mean that there is an angle of preferably 90°±10°, more preferably of 90°±5°, more preferably of 90°±3°, more preferably of 90°±1°, more preferably of exactly 90°, between the axis of rotation and the cutting edge.

Preferably, the tiltable blade holder segment is tiltable around a bolt that is oriented parallel to the conveying direction of the carcass part or perpendicular to the cutting edge. The axis of rotation is assigned to the bolt. In particular, the bolt may be oriented essentially parallel to the conveying direction. The bolt can be a screw, a shaft, or the like. The bolt can function as the axis of rotation around which the tiltable blade holder segment can be rotated or tilted. The non-tiltable blade holder segment can be attached to a frame structure or a shoe plate of the trimming device or the like.

According to an embodiment, the blade is a continuous blade, wherein the cutting edge is elastically deformed when the tiltable blade holder segment is tilted relative to the non-tiltable blade holder segment by means of the actuator.

Hence, the cutting edge is also continuous. In this case, the geometry of the cutting edge is changed or altered by bending the continuous blade. Thus, the curvature of the cutting edge is altered. The curvature can be increased or decreased.

According to another embodiment, the blade comprises a plurality of blade segments, wherein the non-tiltable blade holder segment and the tiltable blade holder segment each hold their own blade segment.

The number of blade segments is arbitrary. The blade segments can be exchanged individually. This is advantageous because not the complete blade needs to be replaced or exchanged in the case of wear or damage of the blade.

According to another embodiment, the blade comprises a blade back that faces away from the cutting edge, wherein the blade holder supports the blade back along its length.

In contrast to the sharp cutting edge, the blade back is blunt. Supporting the blade back along its length leads to a good support of the blade and prevents an undefined bending of the blade. The blade holder can support the blade back along its entire length or along a part or section of the length. Each blade segment comprises a blade back that is supported by the assigned blade holder segment.

According to another embodiment, the tiltable blade holder segment is tiltable relatively to the non-tiltable blade holder segment from an untilted position into a tilted position, wherein an inclination angle between the non-tiltable blade holder segment and the tiltable blade holder segment is smaller in the tilted position than in the untilted position.

Preferably, there are provided a plurality of intermediate positions between the untilted position and the tilted position. In other words, the tiltable blade holder segment cannot be only moved from the untilted position into the tilted position and vice versa, but also into an arbitrary number of intermediate positions. Thus, the tiltable blade holder segment can be adjusted stepless. Preferably, there is provided a first tiltable blade holder segment, which is inclined in relation to the non-tiltable blade holder segment in a first inclination angle, and a second tiltable blade holder segment that is inclined in relation to the non-tiltable blade holder segment in a second inclination angle. The first inclination angle and the second inclination angle differ from each other. Preferably, the first tiltable blade holder segment is coupled to the non-tiltable blade holder segment and the second tiltable blade holder segment is coupled to the first tiltable blade holder segment. Thus, the first tiltable blade holder segment is sandwiched between the non-tiltable blade holder segment and the second tiltable blade holder segment. Preferably, there is provided a pair of first tiltable blade segments that sandwich the non-tiltable blade segment. "Sandwich" in this context means that the non-tiltable blade holder segment is arranged between the pair of first tiltable blade holder segments. A pair of second tiltable blade segments can sandwich the pair of first blade holder segments.

According to another embodiment, the blade is only firmly attached to the non-tiltable blade holder segment.

Preferably, this embodiment is used with the continuous blade. The blade can be clamped by means of the non-tiltable blade holder segment. The blade can also be screwed or riveted to the non-tiltable blade holder segment. Preferably, the tiltable blade holder segments can have finger sections that are designed to encompass the blade from above and below. Each tiltable blade holder segment can have two or three finger sections that are arranged alternating below and above the blade. Thus, the finger sections sandwich the blade. The finger sections only support the blade without clamping it. That means that the blade preferably is not firmly attached to the tiltable blade holder segments.

According to another embodiment, the blade holder comprises two tiltable blade holder segments that are rotatably coupled to the non-tiltable blade holder segment, wherein the non-tiltable blade holder segment is arranged in between the two tiltable blade holder segments.

Alternatively, the blade holder can comprise the non-tiltable blade holder segment and only one tiltable blade holder segment. The two tiltable blade holder segments that are rotatably coupled to the non-tiltable blade holder segment can be named first tiltable blade holder segments. The two first tiltable blade holder segments are coupled to the non-tiltable blade holder segment by means of the aforementioned bolts or the axis of rotation. In this way, the first tiltable blade holder segments can be tilted or rotated in relation to the non-tiltable blade holder segment. The non-tiltable blade holder segment is sandwiched between the first tiltable blade holder segments.

According to another embodiment, the blade holder comprises a first tiltable blade holder segment and a second tiltable blade holder segment, wherein the first tiltable blade holder segment is rotatably coupled to the second tiltable blade holder segment, and wherein the first tiltable blade holder segment is rotatably coupled to the non-tiltable blade holder segment.

As mentioned before, the blade holder can comprise an arbitrary number of tiltable blade holder segments. Preferably, there are provided two first tiltable blade holder segments and two second tiltable blade holder segments. Thus, a pair of first tiltable blade holder segments and a pair of second tiltable blade holder segments is provided. However, the blade holder can comprise six, eight, ten or even more than ten tiltable blade holder segments. These tiltable blade holder segments can all be provided in pairs. Preferably, the non-tiltable blade holder segment is arranged between the two first tiltable blade holder segments. The non-tiltable blade holder segment and the two first tiltable blade holder segments are arranged between the two second tiltable blade holder segments. In other words, on each side of the non-tiltable blade holder segment are arranged one first tiltable blade holder segment and one second tiltable blade holder segment. The first tiltable blade holder segments are rotatably coupled to the non-tiltable blade holder segments preferably by means of the aforementioned bolts. Preferably, the second tiltable blade holder segments are rotatably coupled to the first tiltable blade holder segments also by means of bolts.

According to another embodiment, the trimming device comprises a tilting mechanism that couples the first tiltable blade holder segment to the second tiltable blade holder segment, wherein the actuator is configured to actuate the tilting mechanism to tilt the first tiltable blade holder segment and the second tiltable blade holder segment in a coupled movement, and wherein both the first tiltable blade holder segment and the second tiltable blade holder segment change the geometry of the cutting edge when being tilted by means of the tilting mechanism to trim the skin and/or fat side into the predetermined shape.

Changing the geometry of the cutting edge can include elastically deforming the continuous cutting edge of the continuous blade. Preferably, there are provided two actuators and two tilting mechanisms. Each actuator is associated with one tilting mechanism. Preferably, each tilting mechanism has a lever that is coupled to a drive shaft of the corresponding actuator. The lever can be coupled to the first tiltable blade holder segment by means of a first push rod and to the second tiltable blade holder segment by means of a second push rod. The push rods have ball heads at their ends. The ball heads are coupled to the lever and to the blade holder segments. When the actuator actuates the tilting mechanism, both the first tiltable blade holder segment and the second tiltable blade holder segment are rotated or tilted at the same time. The first tiltable blade holder segment is tilted in relation to the non-tiltable blade holder segment. The second tiltable blade holder segment is tilted in relation to the first tiltable blade holder segment. By means of the tilting mechanism, it is possible to tilt the first tiltable blade holder segment and the second tiltable blade holder segment at the same time with only one actuator. The production costs of the trimming device can be reduced due to the reduced number of actuators.

According to another embodiment, the trimming device comprises a first actuator that is configured to tilt the first tiltable blade holder segment and a second actuator that is configured to tilt the second tiltable blade holder segment, wherein both the first tiltable blade holder segment and the second tiltable blade holder segment change the geometry of the cutting edge when being tilted by means of the first actuator and the second actuator to trim the skin and/or fat side into the predetermined shape.

In this case, each tiltable blade holder segment has its own actuator. This enables more flexible movement of the tiltable blade holder segments. Four actuators are provided in the case that the trimming device comprises two first tiltable blade holder segments and two second tiltable blade holder segments.

According to another embodiment, the actuator is configured to dynamically tilt the tiltable blade holder segment based on the information concerning the profile of the skin and/or fat side while trimming the skin and/or fat side into the predetermined shape.

"Dynamically" in this context means that the inclination angle of the tiltable blade holder segments is changed during the process of trimming the skin and/or fat side. Thus, the geometry of the cutting edge can be adjusted to the profile of the skin and/or fat side during the trimming process. This enables to adjust the blade to unevenly shaped carcass parts.

Furthermore, a trimming system for trimming a carcass part having a skin and/or fat side is provided. The trimming system comprises a trimming device as explained before, and an imaging device for capturing information concerning the profile of the skin and/or fat side by scanning the carcass part.

Preferably, the trimming device is a module or has a modular shape so that the trimming device can easily be exchanged. The imaging device can comprise a camera, a laser scanner, an ultrasound imager, an X-ray imager or the like. "Scanning" the carcass part in this context means that the imaging device is designed to capture an image of the front face of the carcass part, capture an image of the surface of the skin and/or fat side and/or capture the side profile of the skin and/or fat side.

According to an embodiment, the imaging device comprises one or more of the following imaging units: an imaging unit for capturing an image of the front face of the carcass part facing the cutting edge, an imaging unit for capturing an image of a surface of the skin and/or fat side, an imaging unit for directly capturing the profile of the skin and/or fat side.

The imaging unit for capturing the image of the front face of the carcass part facing the blade can be referred to as first imaging unit. The imaging unit for capturing the image of the surface of the skin and/or fat side can be referred to as the second imaging unit. The imaging unit for directly capturing the profile of the skin and/or fat side can be referred to as third imaging unit.

According to another embodiment, the imaging device comprises a first imaging unit for capturing an image of the front face of the carcass part facing the cutting edge.

The first imaging unit can be a camera or can comprise a camera. The first imaging unit can also comprise more than one camera. Using a camera as the first imaging unit is cost-efficient. The first imaging unit captures the front face so that the thickness of the fat layer and the skin can be captured.

According to another embodiment, the imaging device comprises a second imaging unit for capturing an image of a surface of the skin and/or fat side.

The second imaging unit can comprise a laser scanner to scan the surface of the skin and/or fat side. By means of the second imaging unit, the three-dimensional geometry of the surface of the skin and/or fat side can be obtained. The second imaging unit can also be suitable to directly capture the side profile of the skin and/or fat side.

According to another embodiment, the imaging device comprises a third imaging unit for directly capturing the profile of the skin and/or fat side.

The third imaging unit is optional. The third imaging unit can replace the first imaging unit and the second imaging unit. However, the third imaging unit can be provided additionally to the first imaging unit and the second imaging unit. The third imaging unit can be suitable to emit and receive electromagnetic radiation. The third imaging unit is designed to directly obtain information concerning the profile of the skin and/or fat side. In other words, the third imaging unit can capture the three-dimensional geometry of the surface of the skin and/or fat side, the geometry of the side profile along the length direction of the carcass part, the thickness of the fat layer and/or the thickness of the skin seen in the length direction as well as in the width direction of the carcass part. The third imaging unit can comprise an X-ray imager or an ultrasound imager.

According to another embodiment, the trimming system further comprises a conveyor for conveying the carcass part to the trimming device along the conveying direction, wherein the skin and/or fat side is facing downwards to the conveyor.

The conveyor can have a conveyor belt and rolls for supporting the conveyor belt. The skin and/or fat side faces downwards to the conveyor belt. There can be provided more than one conveyor. For example, there can be provided two conveyors with a gap in between. In this gap, the second imaging unit and/or the third imaging unit can be placed. The conveyor is optional. The trimming system can also be manually fed. The trimming system can also have a pushing device that is designed to push the carcass part in the conveying direction to the trimming device. The pushing device is optional.

According to another embodiment, the trimming system further comprises a drive roll for holding the carcass part down during the trimming thereof.

The drive roll is optional. The drive roll can be driven by an electric motor or the like. The drive roll is also capable of conveying the carcass part in the conveying direction to the trimming device. The drive roll is designed to press the carcass part against the conveyor.

According to another embodiment, the trimming system further comprises a tooth roll for gripping a sheet of the skin and/or fat side that has been trimmed off the skin and/or fat side.

The sheet comprises the skin and parts of the fat layer. The tooth roll is optional. The tooth roll is preferably arranged below the trimming device. The tooth roll is preferably designed to grip the skin.

According to another embodiment, the trimming system further comprises a shoe plate that guides the sheet away from the trimming device.

The shoe plate has a curved cross section. The tooth roll is arranged next to the shoe plate. There is provided a gap between the shoe plate and the tooth roll. The gap is adjustable. In operation of the trimming system, the sheet that has been cut off the skin and/or fat side is drawn into said gap by means of the tooth roll and is guided away from the trimming device by means of the shoe plate. The non-tiltable blade holder segment can be firmly attached to the shoe plate. However, this is optional. The blade can be clamped between a clamping section of the non-tiltable blade holder segment and the shoe plate. Before starting to trim the skin and/or fat side, a height adjustment of the trimming device in relation to the tooth roll is performed to adjust a thickness of the sheet that has to be cut off the skin and/or fat side.

According to another embodiment, the trimming device is movable in multiple directions in relation to the tooth roll.

This can be done to adjust the gap between the tooth roll and the shoe plate. The multiple directions can be the spatial directions mentioned before. For example, the trimming device can be moved in a length direction or x-direction, a height direction or y-direction and/or a width direction or z-direction of the trimming system. The trimming device can also be tilted around the aforementioned aforementioned directions. "Movable" includes transversal and rotational movements. In particular, the height direction is adjusted to determine the thickness of the sheet that has been cut off from the skin and/or fat side. The trimming device can also be movable in multiple directions in relation to the shoe plate. However, this is optional.

According to another embodiment, the tooth roll comprises a plurality of teeth that are designed to grip the sheet of the skin and/or fat side that has been trimmed off the skin and/or fat side.

Moreover, a method for trimming a carcass part having a skin and/or fat side by means of a trimming device for trimming the carcass part is provided. The trimming device comprises a blade having a cutting edge, a blade holder for holding the blade, wherein the blade holder comprises a tiltable blade holder segment and a non-tiltable blade holder segment, wherein the tiltable blade holder segment is rotatably coupled to the non-tiltable blade holder segment around an axis of rotation, wherein the axis of rotation is oriented parallel to a conveying direction along which the carcass part is transported to the trimming device, and an actuator that is configured to tilt the tiltable blade holder segment relative to the non-tiltable blade holder segment. The method comprises the following steps: a) conveying the carcass part to the trimming device along the conveying direction so that a front face of the carcass part faces the cutting edge, b) tilting the tiltable blade holder segment relative to the non-tiltable blade holder segment by means of the actuator based on information concerning a profile of the skin and/or fat side, c) changing a geometry of the cutting edge by means of the tiltable blade holder segment being tilted relative to the non-tiltable blade holder segment, and d) trimming the skin and/or fat side into a predetermined shape.

Preferably, the steps a) to d) are performed subsequently. However, the steps b) and c) can be performed simultaneously. In step b), a plurality of tiltable blade holder segments can be tilted by means of the actuator or by means of more than one actuator. The information concerning the profile of the skin and/or fat side is obtained by means of the imaging device of the trimming system. Before step b), the blade holder segments are preferably arranged in an inclination angle of 180°. Thus, in the initial or untilted position, the blade holder and thus the blade is flat. When tilting the tiltable blade holder segment relative to the non-tiltable blade holder segment, the inclination angle reduces and becomes smaller than 180°. Hence, before step b), the tiltable blade holder segment is in the untilted position.

According to an embodiment, the tiltable blade holder segment is dynamically tilted based on the information concerning the profile of the skin and/or fat side while trimming the skin and/or fat side into the predetermined shape.

As mentioned before, "dynamically" in this context means that the inclination angle of the tiltable blade holder segments is changed while performing the step d) of trimming the skin and/or fat side into the predetermined shape. This has the advantage that even very irregular-shaped carcass parts can be processed.

According to another embodiment, the information concerning the profile of the skin and/or fat side includes information relating to a profile of the skin and/or fat side along a length direction of the carcass part and along a width direction of the carcass part.

The information relating to the profile along the length direction and the width direction can be obtained by processing a sample carcass part. Preferably, an image of the front face of the carcass part is taken by means of the first imaging unit. The sample carcass part is then subsequently cut into slices, wherein after each cut another image of the front face is taken by means of the first imaging unit. By taking the plurality of images of the front face, data concerning the geometry and the thickness of the skin and/or fat side along the length direction and along the width direction can be obtained. Before cutting the sample carcass part into slices, the second imaging unit can be used to scan the surface of the skin and/or fat side and to capture an image of the surface and/or the side profile of the skin and/or fat side.

According to another embodiment, the information concerning the profile of the skin and/or fat side is obtained by combining data from an imaging device scanning the carcass part and sample data.

The sample data can be obtained as mentioned before by means of a sample carcass part. To combine the data, the controller that also controls the actuators is provided. The controller has a calculating unit. The controller combines the data obtained from the first imaging unit, the data obtained from the second imaging unit and the sample data such that a three-dimensional model of the profile of the skin and/or fat side can be calculated. Based on this profile obtained from a sample carcass part, it is possible to estimate the profile of the skin and/or fat side for each carcass part based on one image of the front face taken by the first imaging unit and the side profile taken by the second imaging unit. For a dynamic trimming process, the side profile of the skin and/or fat side is the key parameter. The profile of the skin and/or fat side obtained from the sample carcass part is preferably stored in a data storage unit of the controller.

According to another embodiment, the imaging device captures an image of the front face of the carcass part facing the cutting edge by means of a first imaging unit.

As mentioned before, the first imaging unit can be a camera or comprise a camera. Using a camera as the first imaging unit is a cost-efficient solution.

According to another embodiment, the imaging device captures an image of a surface of the skin and/or fat side by means of a second imaging unit.

The second imaging unit can be a laser scanner or can comprise a laser scanner. The second imaging unit is also capable of capturing the side profile of the skin and/or fat side while trimming the skin and/or fat side so that the actuators can dynamically actuate the tiltable blade holder segments while trimming the skin and/or fat side.

According to another embodiment, the imaging device obtains a side profile of the skin and/or fat side from the captured image of the surface thereof, wherein the image of the front face of the carcass part, the side profile of the skin and/or fat side and the sample data are combined to the information concerning the profile of the skin and/or fat side being used to actuate the actuator.

Before actuating the actuators, an operator provides the predetermined shape of the carcass part or of the skin and/or fat side to the controller. As mentioned before, "predetermined shape" means that the skin and the part of the fat layer are cut away to provide the carcass part with a fat layer of a defined thickness. The carcass part is conveyed in the conveying direction to the cutting edge of the blade. Based on the information obtained from the first imaging unit, the second imaging unit as well as on the sample profile of the skin and/or fat side, stored in the data storage unit, the profile of the skin and/or fat side of the carcass part being conveyed to the trimming device is estimated. The controller controls the actuator or the actuators to tilt all or some of the tiltable blade holder segments to cut the skin and/or fat side into the predetermined shape.

According to another embodiment, before step a), an initial height of the trimming device to a tooth roll is adjusted.

As mentioned before, there is provided a gap between the tooth roll and the shoe plate. By adjusting the initial height of the trimming device, the initial thickness of the sheet that has to be cut off from the skin and/or fat side is adjusted.

According to another embodiment, the tooth roll grips a sheet of the skin and/or fat side that has been trimmed off the skin and/or fat side.

The sheet is guided into the gap that is provided between the shoe plate and the tooth roll. The tooth roll and the shoe plate guide the sheet downwards and away from the trimming device and the carcass part. The sheet comprises the skin and a part of the fat layer.

According to another embodiment, the blade holder comprises a non-tiltable blade holder segment, wherein the tiltable blade holder segment is rotatably coupled to the non-tiltable blade holder segment, wherein the sheet is gripped along the entire width of the non-tiltable blade holder segment, but is not gripped along the entire width of the tiltable blade holder segment, and wherein the blade trims the skin and/or fat side along the width of the non-tiltable blade holder segment and the width of the tiltable blade holder segment.

In other words, the sheet is only gripped along a part of the width of the tiltable blade holder segment. Since the blade trims the skin and/or fat side along both the width of the non-tiltable blade holder segment and the width of the tiltable blade holder segment, the whole length of the blade is used to cut through the fat layer of the skin and/or fat side of the carcass part.

The embodiments and features described for the proposed trimming device apply accordingly to the proposed trimming system as well as to the proposed method and vice versa.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the present invention will become apparent from the subsequent description and dependent claims, taken in conjunction with the accompanying drawings, in which:

DETAILED DESCRIPTION OF VARIOUS EMBODIMENTS

Figure 1:
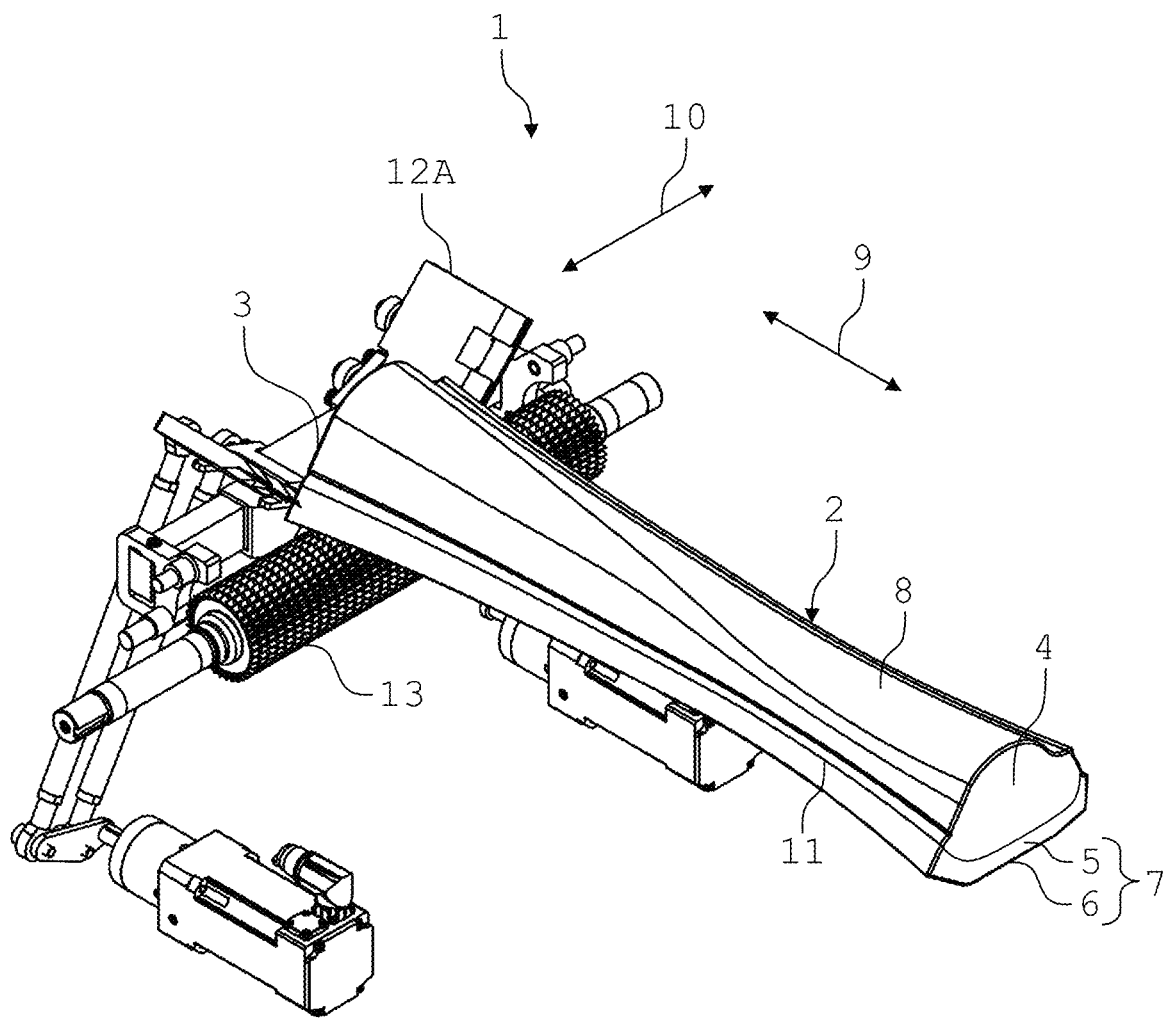
FIG. 1 shows a schematic perspective view of one embodiment of a trimming system for trimming a carcass part having a skin and/or fat side.

In the Figures, like reference numerals designate like or functionally equivalent elements, unless otherwise indicated.

Figure 2:
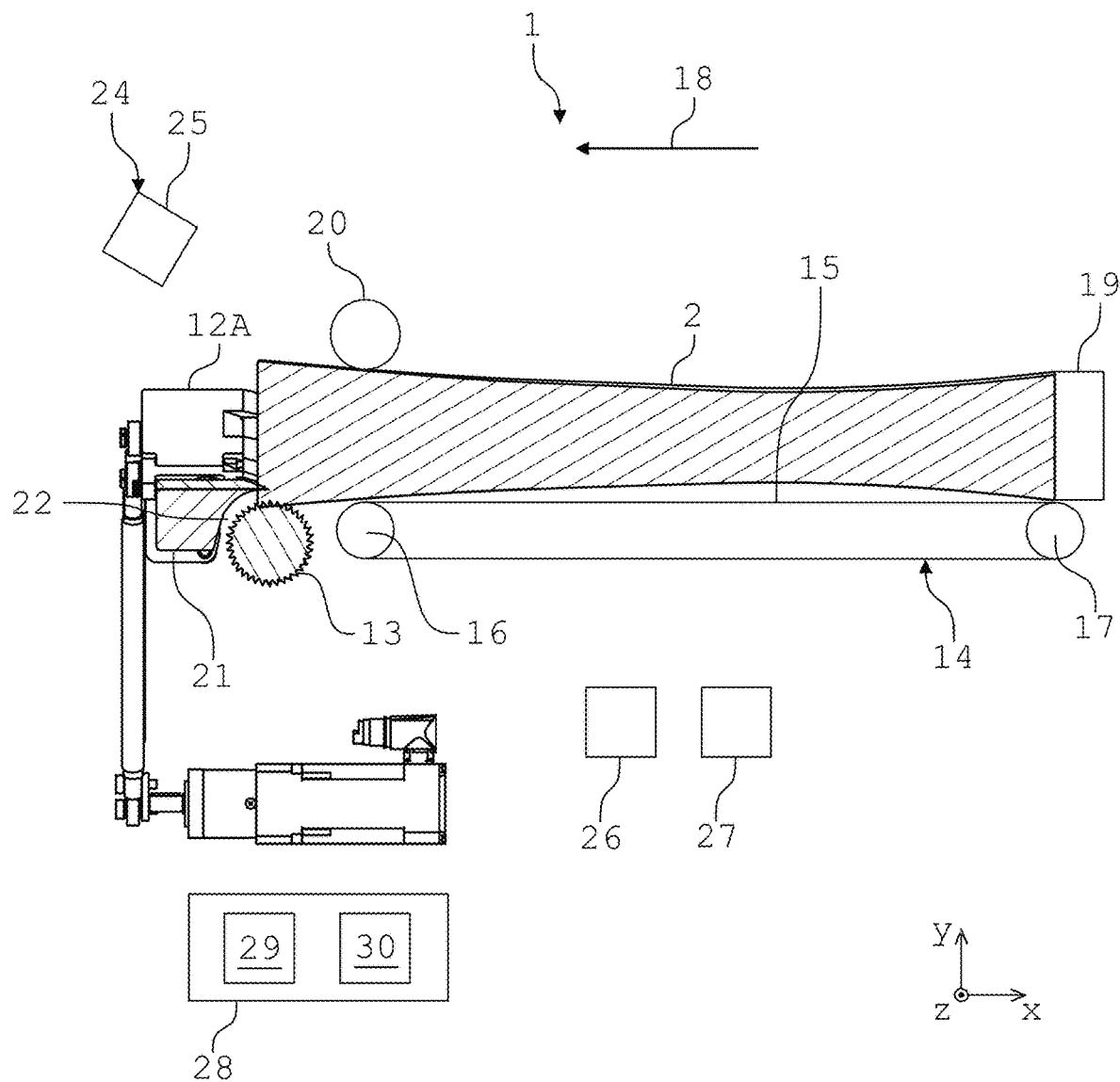
FIG. 2 shows a schematic cross-sectional view of the trimming system according to FIG. 1.
Figure 3:
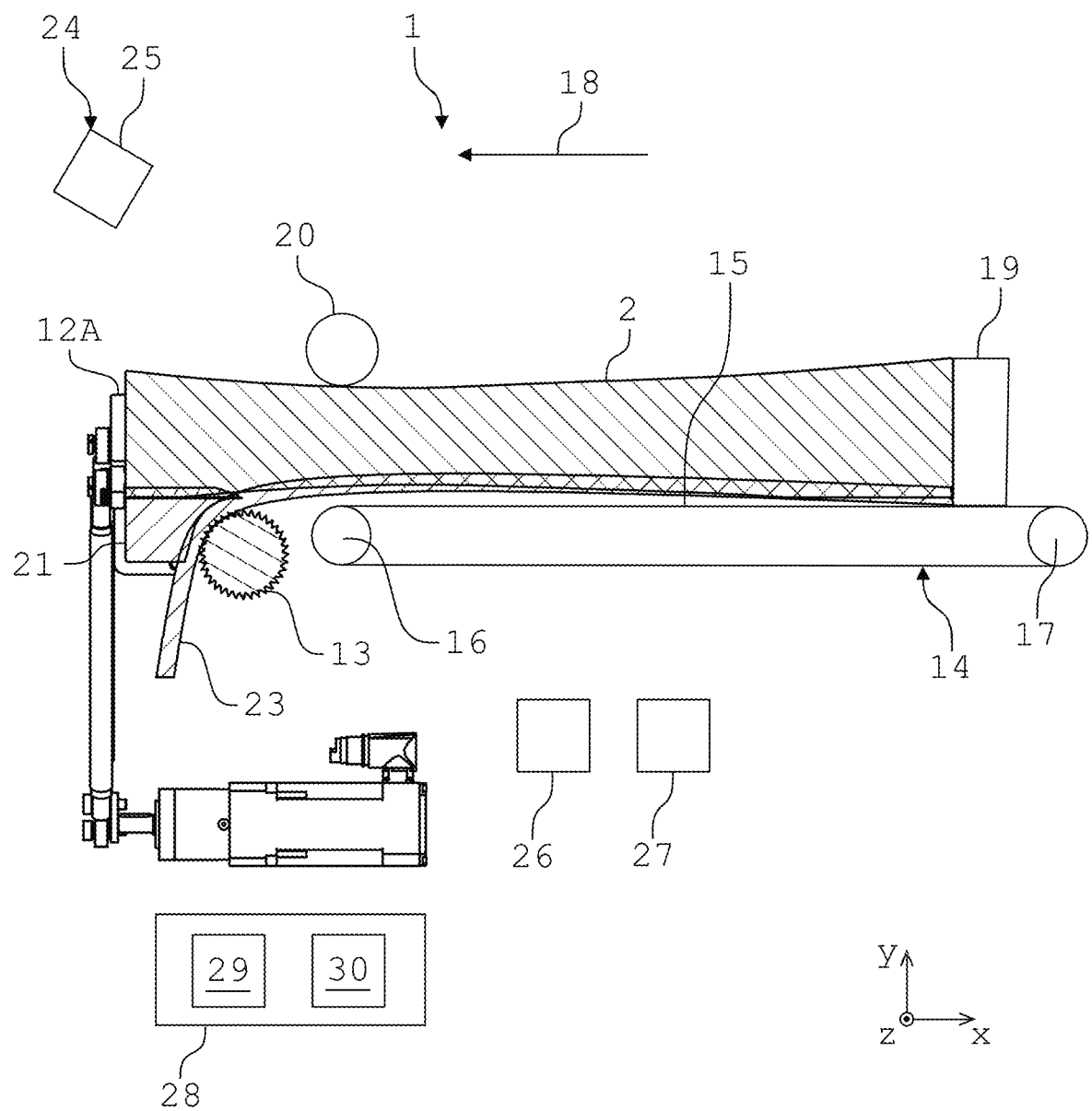
FIG. 3 shows a further schematic cross-sectional view of the trimming system according to FIG. 1.

FIG. 1 shows a schematic perspective view of one embodiment of a trimming system 1 for trimming a carcass part 2. FIGS. 2 and 3 both show schematic cross-sectional views of the trimming system 1. In the following, FIGS. 1 to 3 will be referred to at the same time.

The carcass part 2 is part of an animal. For example, the carcass part 2 is pork, beef, or lamb. Preferably, the carcass part 2 is pork. The carcass part 2 is loin or pork loin. Thus, the carcass part 2 can be named loin. The carcass part 2 has a front face 3 that faces away from a viewer in FIG. 1 and a back face 4. The carcass part 2 has a fat layer 5 that is covered by skin 6. However, the skin 6 can already be removed from the fat layer 5. The fat layer 5 and the skin 6 form a skin and/or fat side 7 of the carcass part 2. The carcass part 2 also has a lean meat layer 8 that is at least partly covered by the fat layer 5 and the skin 6. The carcass part 2 has a length direction 9 and a width direction 10. The skin and/or fat side 7 has a side profile 11 that runs along the length direction 9. The side profile 11 marks an interface between the skin and/or fat side 7 and the lean meat layer 8.

The trimming system 1 is designed to trim the skin and/or fat side 7 into a predetermined shape. "Predetermined shape" in this context means that the skin 6 and a part of the fat layer 5 are cut away to provide the carcass part 2 with a fat layer 5 of a defined thickness. For trimming the skin and/or fat side 7, a trimming device 12A is provided. The trimming device 12A is part of the trimming system 1. The trimming device 12A will be explained in detail later. The trimming device 12A is a module that can be exchanged.

The trimming system 1 is described with reference to a coordinate system comprising a length direction or x-direction x, a height direction or y-direction y and a width direction or z-direction z. The directions x, y, z are arranged perpendicular to each other. The directions x, y, z can be named spatial directions. The length direction 9 is arranged parallel to the x-direction x. The width direction 10 is arranged parallel to the z-direction z.

Apart from the trimming device 12A, the trimming system 1 comprises a tooth roll 13. The tooth roll 13 is driven by a drive element. The drive element can be an electric motor. The tooth roll 13 comprises a plurality of teeth that are designed to grip the skin 6 and the part of the fat layer 5 that is cut away from the carcass part 2.

The trimming system 1 further has a conveyor 14. The conveyor 14 comprises a conveyor belt 15 and two rolls 16, 17. At least one of the rolls 16, 17 is driven, for example by means of an electric motor. The conveyor 14 is designed to transport the carcass part 2 in a conveying direction 18 towards the trimming device 12A. The conveying direction 18 is arranged parallel to the x-direction x. The skin and/or fat side 7 faces the conveyor 14, in particular the conveyor belt 15. The conveyor 14 is optional. The trimming system 1 can also be manually fed.

Instead of the conveyor 14, a pushing device 19 can be provided. Alternatively, the trimming system 1 can have both the conveyor 14 and the pushing device 19. The pushing device 19 can push the carcass part 2 along the conveying direction 18. The pushing device 19 can be driven by an electric motor or the like.

The trimming system 1 can be provided with a drive roll 20. The drive roll 20 is optional. The drive roll 20 is placed above the carcass part 2 so that the carcass part 2 is placed between the tooth roll 13 and the drive roll 20. The drive roll 20 pushes the carcass part 2 down against the conveyor 14. The drive roll 20 also transports the carcass part 2 along the conveying direction 18.

The trimming system 1 has a shoe plate 21. In the cross-sectional views according to FIGS. 2 and 3, the shoe plate 21 has a curved shape. Between the shoe plate 21 and the tooth roll 13, a gap 22 is provided. In operation of the trimming system 1, the shoe plate 21 guides a sheet 23 of the skin and/or fat side 7 that has been trimmed off the carcass part 2 away from the trimming device 12A into the gap 22. The size of the gap 22 can be adjusted. The sheet 23 comprises the skin 6 and a part of the fat layer 5.

Furthermore, the trimming system 1 comprises an imaging device 24 for capturing information concerning a profile of the skin and/or fat side 7. The "profile" in this context can comprise a three-dimensional geometry of a surface of the skin and/or fat side 7, a geometry of the side profile 11 along the length direction 9, a thickness of the fat layer 5 and/or a thickness of the skin 6 seen in the length direction 9 as well as in the width direction 10.

The imaging device 24 comprises a first imaging unit 25, a second imaging unit 26 and a third imaging unit 27. At least the third imaging unit 27 is optional. The first imaging unit 25 is placed above the carcass part 2 so that the first imaging unit 25 can capture an image of the front face 3 of the carcass part 2. The first imaging unit 25 can be a camera. The first imaging unit 25 captures both the lean meat layer 8 and the skin and/or fat side 7 of the front face 3.

The second imaging unit 26 is placed below the carcass part 2. There can be provided two conveyors 14 with a gap in between (not shown). The second imaging unit 26 can be placed in that gap. The second imaging unit 26 is capable of capturing an image of the surface of the skin and/or fat side 7. The second imaging unit 26 can comprise a laser scanner to scan the surface of the skin and/or fat side 7. By means of the second imaging unit 26, the three-dimensional geometry of the surface of the skin and/or fat side 7 can be obtained. The second imaging unit 26 can be suitable to capture the side profile 11 of the skin and/or fat side 7.

As mentioned before, the third imaging unit 27 is optional. The third imaging unit 27 can replace the first imaging unit 25 and the second imaging unit 26. However, the third imaging unit 27 may also be provided additionally to the first imaging unit 25 and the second imaging unit 26. The third imaging unit 27 is designed to directly obtain information concerning the profile of the skin and/or fat side 7. In other words, the third imaging unit 27 can capture the three-dimensional geometry of the surface of the skin and/or fat side 7, the geometry of the side profile 11 along the length direction 9, the thickness of the fat layer 5 and/or the thickness of the skin 6 seen in the length direction 9 as well as in the width direction 10. The third imaging unit 27 can comprise an X-ray imager or an ultrasound imager.

The trimming system 1 has a controller 28 for controlling the trimming system 1. The controller 28 has a calculating unit 29 and a data storage unit 30. The controller 28 communicates with the trimming device 12A, the tooth roll 13, in particular with the drive element of the tooth roll 13, the conveyor 14, the pushing device 19, the drive roll 20 and/or the imaging device 24, in particular the imaging units 25 to 27, to control the trimming system 1 to trim the skin and/or fat side 7 into the predetermined shape. The communication can be wireless, or wire based.

Figure 4:
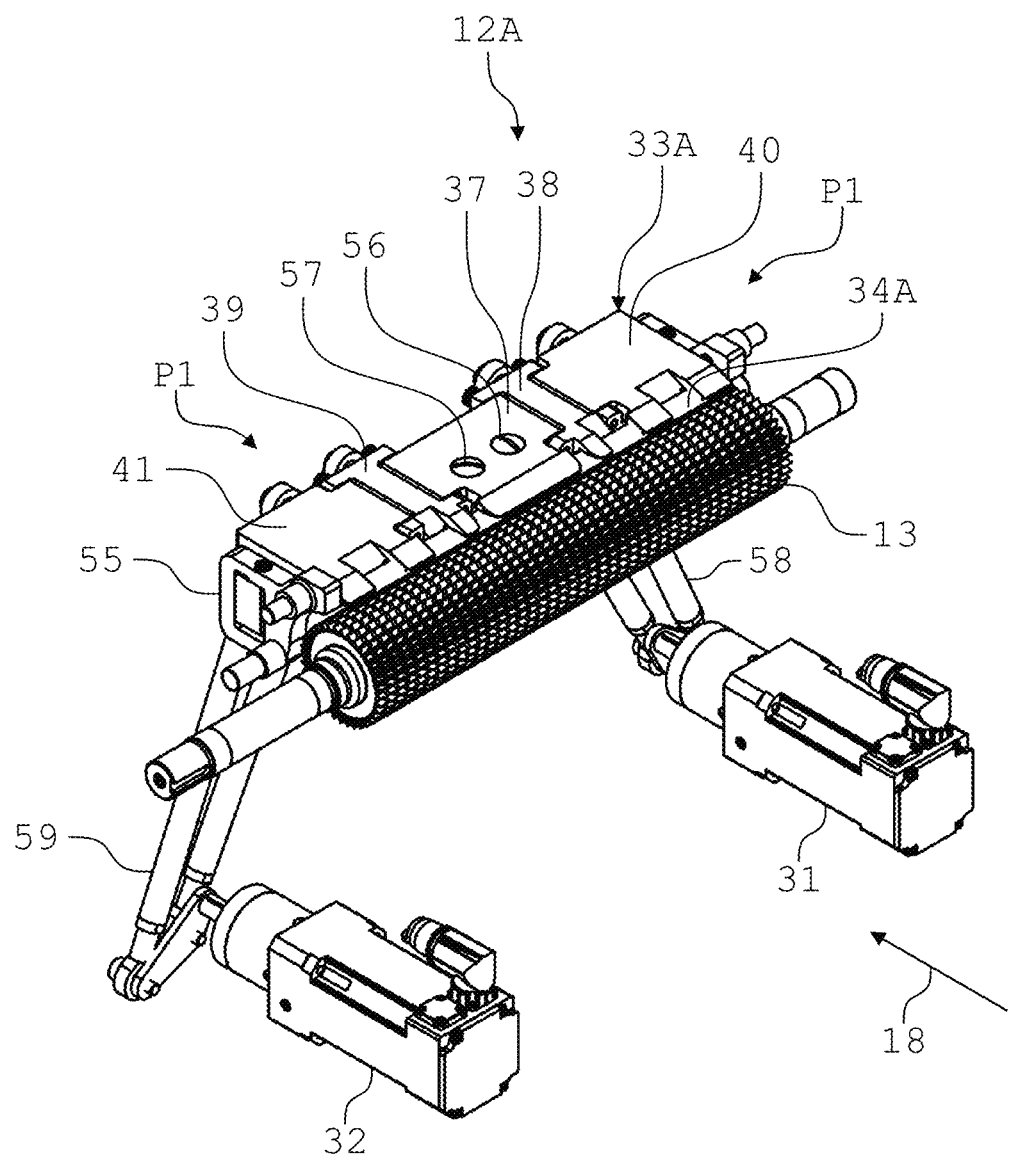
FIG. 4 shows a schematic perspective view of one embodiment of a trimming device for the trimming system according to FIG. 1.
Figure 5:
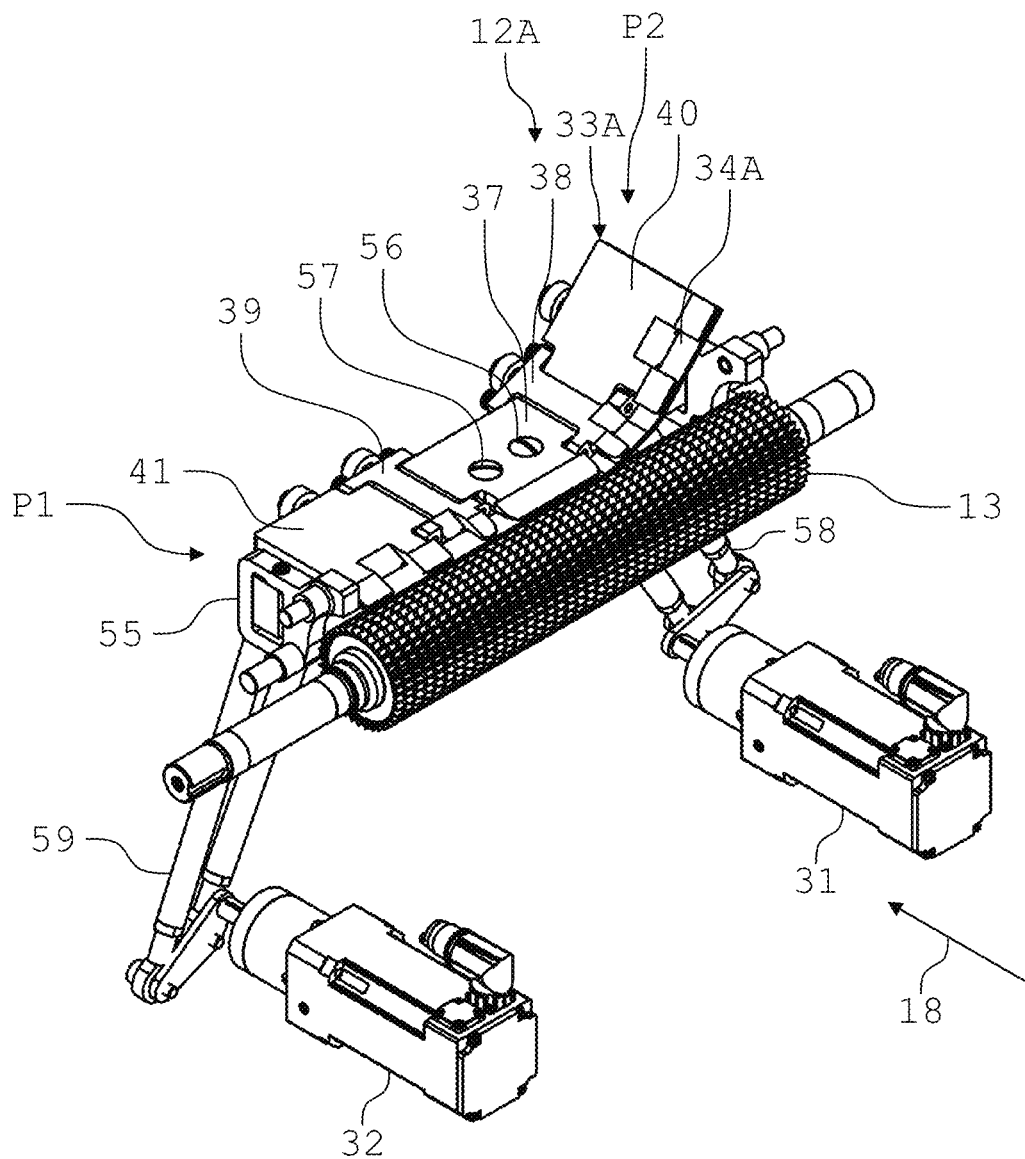
FIG. 5 shows a further schematic perspective view of the trimming device according to FIG. 4.
Figure 6:
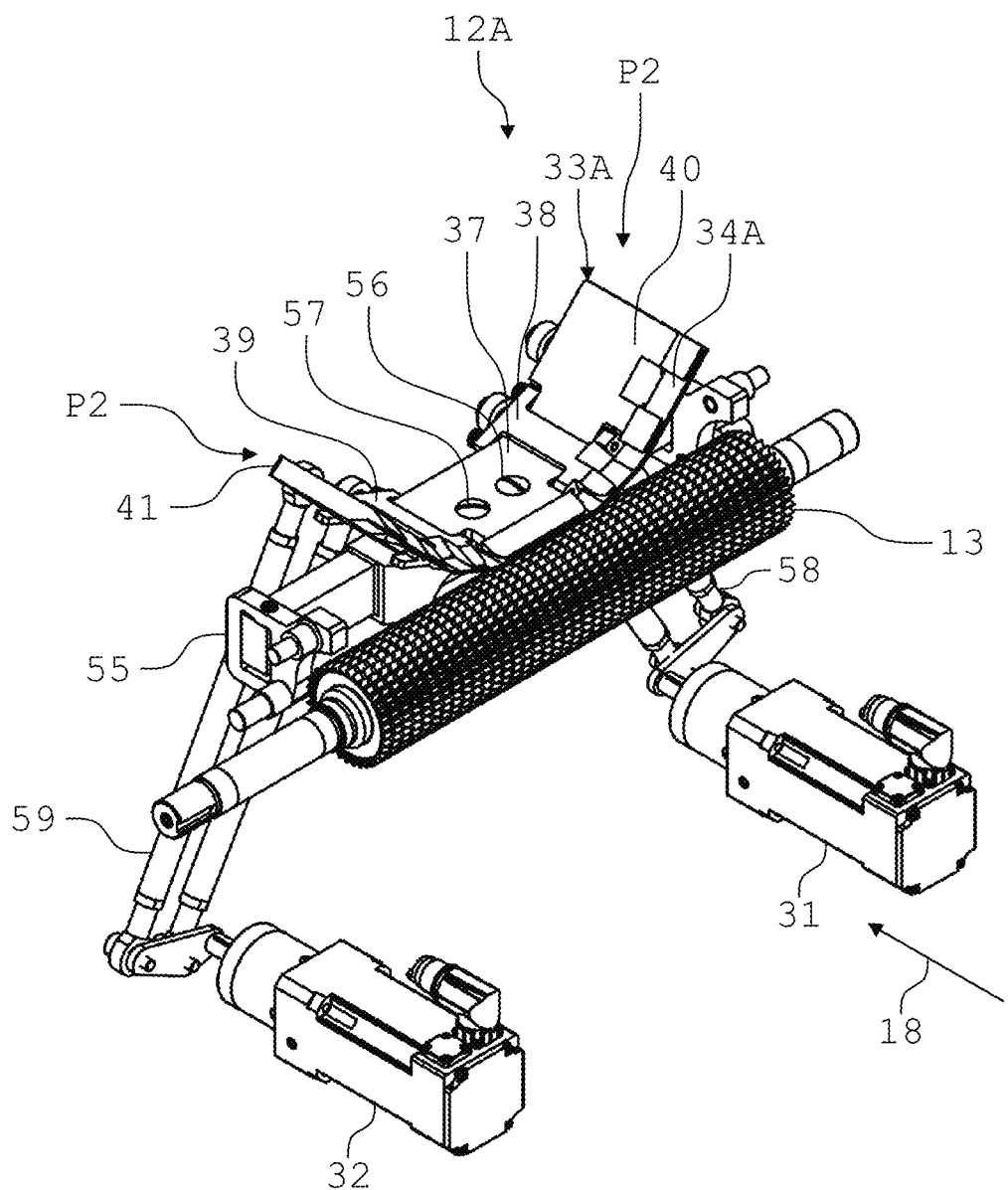
FIG. 6 shows a further schematic perspective view of the trimming device according to FIG. 4.
Figure 7:
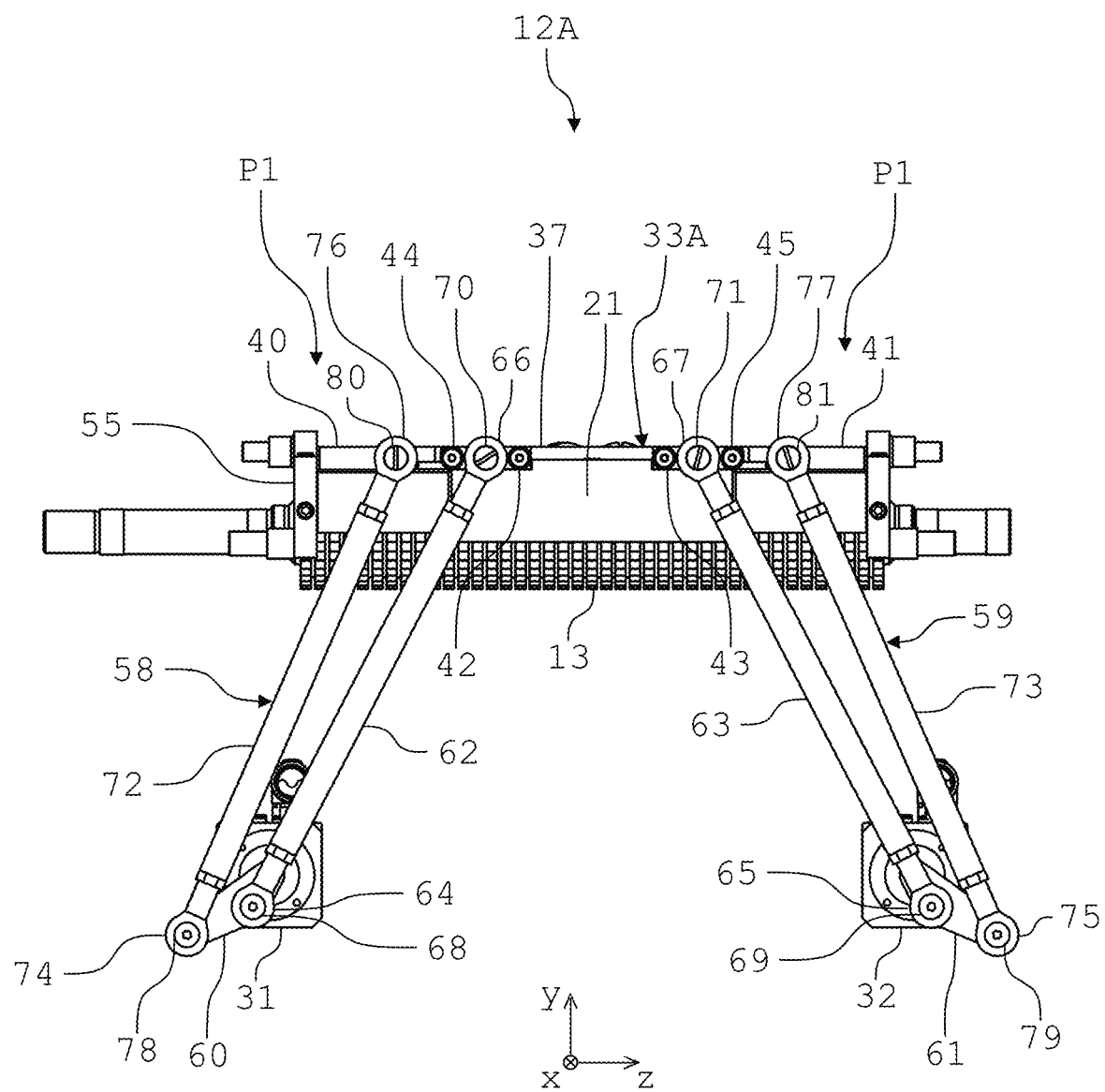
FIG. 7 shows a schematic back view of the trimming device according to FIG. 4.
Figure 8:
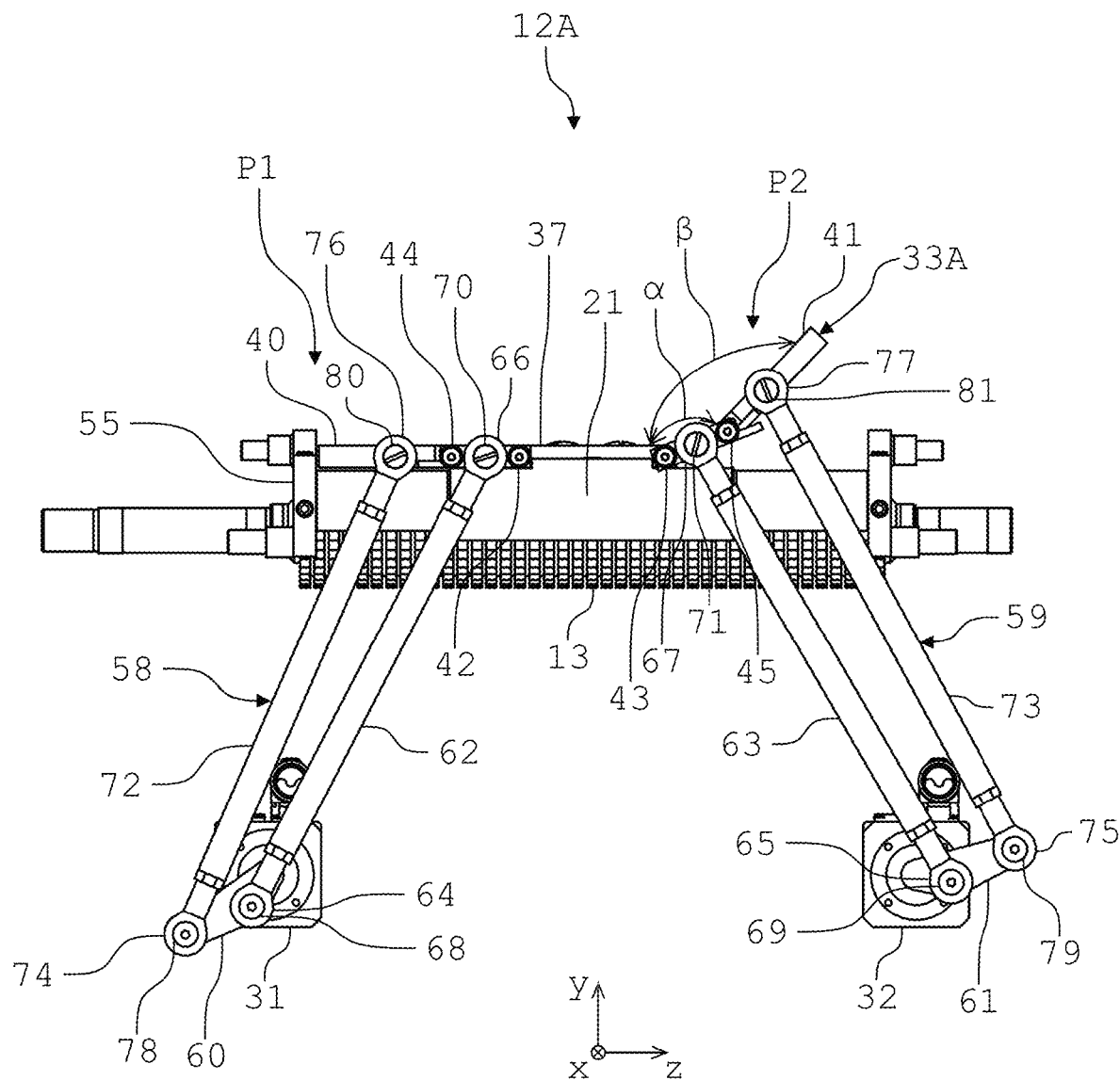
FIG. 8 shows a further schematic back view of the trimming device according to FIG. 4.
Figure 9:
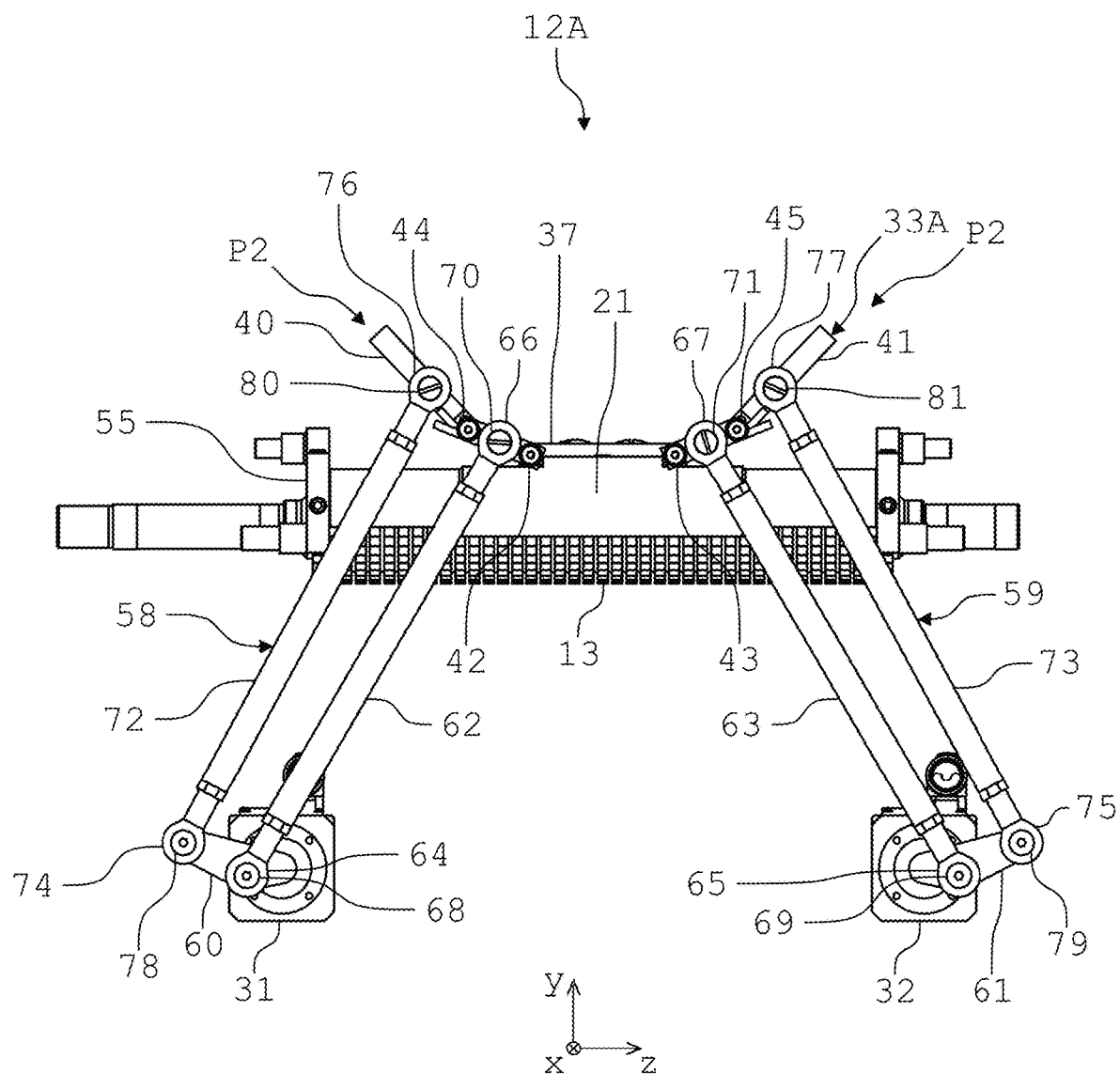
FIG. 9 shows a further schematic back view of the trimming device according to FIG. 4.

FIGS. 4 to 6 show perspective views of one embodiment of the trimming device 12A. FIGS. 7 to 9 show back views of the trimming device 12A. In the following, FIGS. 4 to 9 will be referred to at the same time.

The trimming device 12A comprises two actuators 31, 32, namely a first actuator 31 and a second actuator 32. The actuators 31, 32 are designed to carry out a rotary movement. Preferably, the actuators 31, 32 are servo motors. The actuators 31, 32 can be controlled by the controller 28 based on information concerning the profile of the skin and/or fat side 7.

The trimming device 12A has a blade holder 33A that is actuated by the actuators 31, 32. One embodiment of the blade holder 33A is shown in schematic perspective views in FIGS. 10 and 11. The blade holder 33A is designed to hold a continuous blade 34A. "Continuous" in this context means that the blade 34A is not segmented or interrupted but has an elongated shape. The blade 34A can be deformed elastically. "Elastically" in this context means that the blade 34A can be deformed from an unbent state shown in FIG. 10 into a bent state shown in FIG. 11 and vice versa without any permanent deformation or damage. However, the blade 34A can also be a discontinuous blade. "Discontinuous" in this context means that the blade 34A can comprise a plurality of blade segments. Thus, the blade 34A can alternatively be segmented.

The blade 34A has a sharp cutting edge 35A that faces the front face 3 of the carcass part 2 during operation of the trimming system 1. The cutting edge 35A is designed to cut through the fat layer 5 to trim the skin and/or fat side 7. A blade back 36 of the blade 34A faces away from the cutting edge 35A. The blade back 36 is supported by the blade holder 33A along a length of the blade 34A. The cutting edge 35A is continuous and can thus be named continuous cutting edge.

Figure 10:
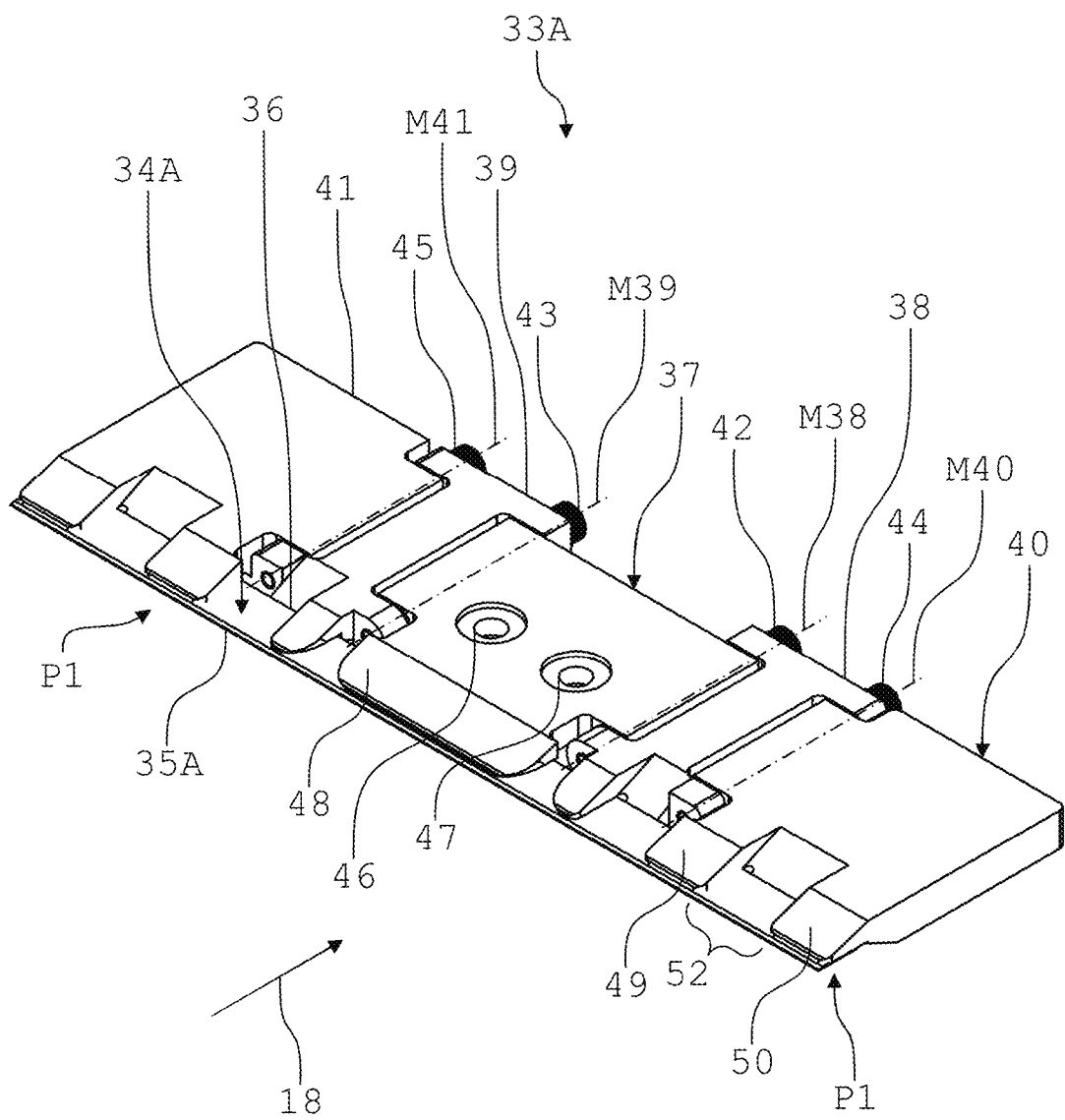
FIG. 10 shows a schematic perspective view of one embodiment of a blade holder for the trimming device according to FIG. 4.
Figure 11:
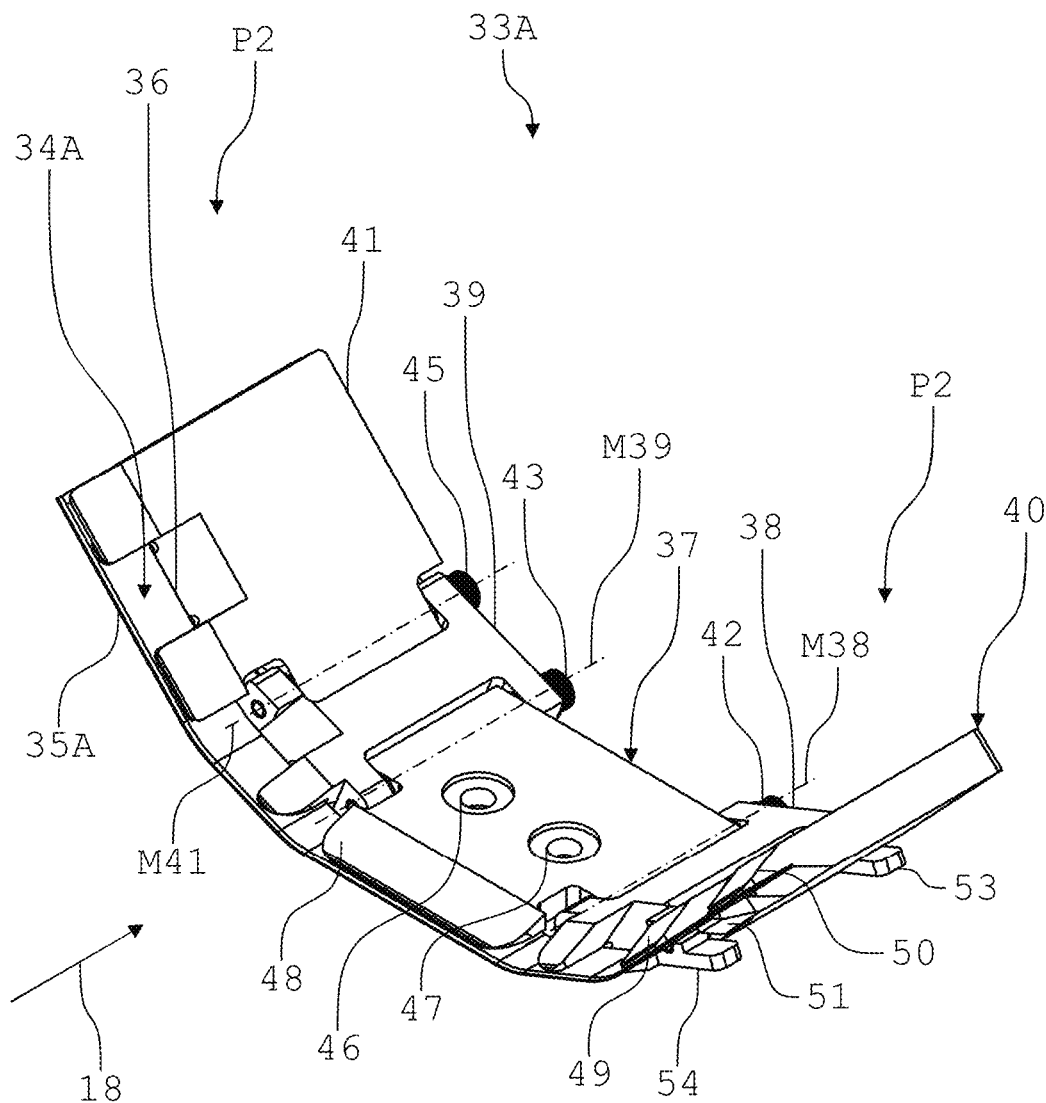
FIG. 11 shows a further schematic perspective view of the blade holder according to FIG. 10.

The blade holder 33A is segmented into a plurality of blade holder segments 37 to 41. The number of blade holder segments 37 to 41 is arbitrary. There can be provided five blade holder segments 37 to 41 as shown in FIGS. 10 and 11. However, there can also be provided seven, nine, eleven or even more blade holder segments 37 to 41.

The blade holder 33A has a non-tiltable blade holder segment 37 that is arranged in the middle of the blade holder segments 38 to 41. "Non-tiltable" in this context means that the non-tiltable blade holder segment 37 cannot be tilted in relation to the other blade holder segments 38 to 41, whereas the blade holder segments 38 to 41 can be tilted or pivoted in relation to the non-tiltable blade holder segment 37. For this reason, the blade holder segments 38 to 41 can be named tiltable blade holder segments.

However, "non-tiltable" does not exclude that the non-tiltable blade holder segment 37 can be moved laterally along the x-direction x, the y-direction y and/or the z-direction z. "Non-tiltable" does also not exclude that the non-tiltable blade holder segment 37 can be tilted or rotated together with the tiltable blade holder segments 38 to 41. In other words, the blade holder 33A itself can be tilted or rotated. Thus, in its narrowest interpretation "non-tiltable" in context with the non-tiltable blade holder segment 37 means that the non-tiltable blade holder segment 37 cannot be rotated or tilted in relation to any of the tiltable blade holder segments 38 to 41. The term "non-tiltable" can be replaced by the terms "non-rotatable", "non-pivotable" or "non-swivelable".

The term "non-tiltable" can also be replaced by the term "fixed" or "attached". Thus, the non-tiltable blade holder segment 37 can be named fixed blade holder segment or attached blade holder segment. "Fixed" or "attached" in this context has the same meaning as "non-tiltable". In other words, the tiltable blade holder segments 38 to 41 can be tilted or rotated in relation to the fixed blade holder segment 37, whereas the fixed blade holder segment 37 itself cannot be rotated or tilted in relation to any of the tiltable blade holder segments 38 to 41. "Fixed" does not exclude that the fixed blade holder segment 37 can be moved laterally along the x-direction x, the y-direction y and/or the z-direction z. "Fixed" does also not exclude that the fixed blade holder segment 37 can be tilted or rotated together with the tiltable blade holder segments 38 to 41. However, in the following the fixed blade holder segment 37 will be named non-tiltable blade holder segment.

The non-tiltable blade holder segment 37 is sandwiched between two first tiltable blade holder segments 38, 39. The non-tiltable blade holder segment 37 and the two first tiltable blade holder segments 38, 39 are sandwiched between two second tiltable blade holder segments 40, 41.

The first tiltable blade holder segment 38 is rotatably supported at the non-tiltable blade holder segment 37 around an axis of rotation M38. The first tiltable blade holder segment 39 is rotatably supported at the non-tiltable blade holder segment 37 around an axis of rotation M39. The second tiltable blade holder segment 40 is rotatably supported at the first tiltable blade holder segment 38 around an axis of rotation M40. The second tiltable blade holder segment 41 is rotatably supported at the first tiltable blade holder segment 39 around an axis of rotation M41.

Each tiltable blade holder segment 38 to 41 is rotatable or tiltable around a corresponding axis of rotation M38, M39, M40, M41. Each tiltable blade holder segment 38 to 41 has at least one axis of rotation M38, M39, M40, M41. Each axis of rotation M38, M39, M40, M41 is oriented parallel to the conveying direction 18 or the length direction 9, respectively. "Parallel" in this context means that there is an angle of preferably 0°±10°, more preferably of 0°±5°, more preferably of 0°±3°, more preferably of 0°±1°, more preferably of exactly 0°, between the axis of rotation M38, M39, M40, M41 and the conveying direction 18 or the length direction 9.

Accordingly, each axis of rotation M38, M39, M40, M41 is oriented perpendicular to the cutting edge 35A. "Perpendicular" in this context can mean that there is an angle of preferably 90°±10°, more preferably of 90°±5°, more preferably of 90°±3°, more preferably of 90°±1°, more preferably of exactly 90°, between the axis of rotation M38, M39, M40, M41 and the cutting edge 35A.

The first tiltable blade holder segments 38, 39 are connected to the non-tiltable blade holder segment 37 by means of bolts 42, 43. The axis of rotation M38 is assigned to the bolt 42. The axis of rotation M39 is assigned to the bolt 43. Each first tiltable blade holder segment 38, 39 can be tilted or rotated in relation to the non-tiltable blade holder segment 37 by means of the corresponding bolt 42, 43.

The second tiltable blade holder segments 40, 41 are connected to the first tiltable blade holder segments 38, 39 by means of bolts 44, 45. The axis of rotation M40 is assigned to the bolt 44. The axis of rotation M41 is assigned to the bolt 45. Each second blade holder segment 40, 41 can be tilted or rotated in relation to the corresponding first tiltable blade holder segment 38, 39 by means of the corresponding bolt 44, 45. The bolts 42 to 45 are arranged parallel to the conveying direction 18.

The non-tiltable blade holder segment 37 has two bores 46, 47 to attach the non-tiltable blade holder segment 37 to the shoe plate 21. The shoe plate 21 can be part of the trimming device 12A. The non-tiltable blade holder segment 37 comprises a wedge-shaped clamping section 48 to clamp the blade 34A. The blade 34A is clamped between the clamping section 48 and the shoe plate 21. The non-tiltable blade holder segment 37 can be made of metal, for example of aluminum or stainless steel. The tiltable blade holder segments 38 to 41 can also be made of metal, for example, of aluminum or stainless steel.

Each of the tiltable blade holder segments 38 to 41 has finger sections 49 to 51 of which only the finger sections 49 to 51 of the second tiltable blade holder segment 40 are provided with reference signs in FIGS. 10 and 11. However, all tiltable blade holder segments 38 to 41 have finger sections 49 to 51. In the following, only the finger sections 49 to 51 of the second tiltable blade holder segment 40 will be referred to.

In the orientation of FIGS. 10 and 11, the finger sections 49, 50 are arranged above the blade 34A. The finger section 51 is arranged below the blade 34A. Between the finger sections 49, 50 is provided a gap 52. The finger section 51 is arranged in that gap 52 so that the finger sections 49, 50 sandwich the finger section 51. The blade 34A is held between the finger sections 49 to 51. However, the blade 34A is not clamped between the finger sections 49 to 51. The blade 34A is also held between the finger sections 49 to 51 of the other tiltable blade holder segments 38, 39, 41.

The first tiltable blade holder segments 38, 39 have supporting sections 53, 54 that support the second tiltable blade holder segments 40, 41 from the back when the tiltable blade holder segments 38 to 41 are in an initial or untilted position P1 as shown in FIG. 10. By means of the actuators 31, 32, the tiltable blade holder segments 38 to 41 can be moved from the untilted position P1 into a tilted position P2 as shown in FIG. 11 and vice versa. The tiltable blade holder segments 38 to 41 can be steplessly adjusted between the untilted position P1 and the tilted position P2 in a plurality of intermediate positions (not shown).

Now turning back to FIGS. 4 to 9, the trimming device 12A further comprises a frame structure 55 that carries the shoe plate 21 and/or the blade holder 33A. By means of screws or bolts 56, 57, the blade holder 33A is attached either directly to the shoe plate 21 or to the frame structure 55. The blade 34A is then clamped between the clamping section 48 of the non-tiltable blade holder segment 37 and the shoe plate 21 or the frame structure 55. The actuators 31, 32 can be attached to the frame structure 55 (not shown).

By means of tilting mechanisms 58, 59, the actuators 31, 32 are coupled to the blade holder 33A. A first tilting mechanism 58 is assigned to the first actuator 31. A second tilting mechanism 59 is assigned to the second actuator 32. By means of each tilting mechanism 58, 59 at least two of the tiltable blade holder segments 38 to 41 can be actuated. "Actuated" in this context means that the tiltable blade holder segments 38 to 41 can be moved from the untilted position P1 into the tilted position P2 and vice versa. The first tilting mechanism 58 actuates the tiltable blade holder segments 38, 40. The second tilting mechanism 59 actuates the tiltable blade holder segments 39, 41. Alternatively, each tiltable blade holder segment 38 to 41 can have its own actuator 31, 32. In this case, four or more actuators 31, 32 are provided.

Each tilting mechanism 58, 59 comprises a lever 60, 61 that is fixed to a drive shaft of the corresponding actuator 31, 32. First push rods 62, 63 connect the levers 60, 61 to the first tiltable blade holder segments 38, 39. The first push rods 62, 63 have ball heads 64 to 67 at their ends. First ball heads 64, 65 of the first push rods 62, 63 are attached to the levers 60, 61 by means of bolts 68, 69. Second ball heads 66, 67 are attached to the first tiltable blade holder segments 38, 39 by means of bolts 70, 71.

Second push rods 72, 73 connect the levers 60, 61 to the second tiltable blade holder segments 40, 41. The second push rods 72, 73 have ball heads 74 to 77 at their ends. First ball heads 74, 75 of the second push rods 72, 73 are attached to the levers 60, 61 by means of bolts 78, 79. Second ball heads 76, 77 are attached to the second tiltable blade holder segments 40, 41 by means of bolts 80, 81.

By actuating the first tilting mechanisms 58 by means of the first actuator 31, the tiltable blade holder segments 38, 40 can be tilted or pivoted together from the untilted position P1 into the tilted position P2 and vice versa. By actuating the second tilting mechanisms 59 by means of the second actuator 32, the tiltable blade holder segments 39, 41 can be tilted or pivoted together from the untilted position P1 into the tilted position P2 and vice versa. Thus, the tiltable blade holder segments 38, 40 and the tiltable blade holder segments 39, 41 can be moved from the untilted position P1 into the tilted position P2 and vice versa independently from each other.

In the tilted position P2, an inclination angle $\alpha$, $\beta$ (FIG. 8) between the non-tiltable blade holder segment 37 and the inclined tiltable blade holder segments 38 to 41 is smaller than in the untilted position P1. In the untilted position P1, the non-tiltable blade holder segment 37 and the tiltable blade holder segments 38 to 41 are arranged parallel to each other. Thus, in the untilted position P1, the inclination angle $\alpha$, $\beta$ has a value of 180°.

A first inclination angle $\alpha$ is measured between the non-tiltable blade holder segment 37 and the first tiltable blade holder segments 38, 39. A second inclination angle $\beta$ is measured between the non-tiltable blade holder segment 37 and the second tiltable blade holder segments 40, 41. By means of the actuators 31, 32, the inclination angles $\alpha$, $\beta$ can be adjusted stepless.

The functionality of the trimming system 1 and the trimming device 12A will be explained in the following. A batch of carcass parts 2 that has to be trimmed is provided. The batch can comprise several hundred to several thousand carcass parts 2. At least one of the carcass parts 2 is taken to generate sample data. The skin and/or fat side 7 of the carcass part 2 is scanned by means of the second imaging unit 26 to capture the surface of the skin and/or fat side 7 and the side profile 11 of the skin and/or fat side 7.

An image of the front face 3 of the carcass part 2 is taken by means of the first imaging unit 25. The carcass part 2 is then subsequently cut into slices, wherein after each cut another image of the front face 3 is taken by means of the first imaging unit 25. By taking the plurality of images of the front face 3, data concerning the geometry and the thickness of the skin and/or fat side 7 along the length direction 9 and along the width direction 10 can be obtained.

The controller 28, in particular the calculating unit 29 of the controller 28, combines the data obtained from the first imaging unit 25 and the data obtained from the second imaging unit 26 such that a three-dimensional model of the profile of the skin and/or fat side 7 can be calculated. As mentioned before, the "profile" of the skin and/or fat side 7 comprises the three-dimensional geometry of the surface of the skin and/or fat side 7, the geometry of the side profile 11 along the length direction 9, the thickness of the fat layer 5 and/or the thickness of the skin 6 seen in the length direction 9 as well as in the width direction 10.

Based on this sample profile obtained from sample data, it is possible to estimate the profile of the skin and/or fat side 7 for each carcass part 2 based on one image of the front face 3 taken by the first imaging unit 25 and the side profile 11 taken by the second imaging unit 26. This sample profile is stored in the data storage unit 30. Alternatively, the profile of the skin and/or fat side 7 can be directly obtained by means of the third imaging unit 27 either for a sample carcass part 2 or for each carcass part 2 individually.

An operator then provides the predetermined shape of the carcass part 2 or of the skin and/or fat side 7 to the controller 28. As mentioned before, "predetermined shape" means that the skin 6 and a part of the fat layer 5 are cut away to provide the carcass part 2 with a fat layer 5 of a defined thickness. This can be a customer specification. The controller 28 then adjusts the height of the shoe plate 21 and the trimming device 12A in the y-direction y. The adjustment can also be done in the x-direction x and/or in the z-direction z. Also pivoting movements of the shoe plate 21 and/or the blade holder 33A around the x-direction x, the y-direction y and/or the z-direction z are possible. An actuator or several actuators (not shown) can be provided for this adjustment. In this way, the size of the gap 22 and thus the thickness of the sheet 23 in the middle thereof is adjusted.

The carcass part 2 is conveyed in the conveying direction 18 towards the cutting edge 35A of the blade 34A. The first imaging unit 25 captures an image of the front face 3 of the carcass part 2 and the second imaging unit 26 scans the skin and/or fat side 7 with the side profile 11. Based on the information obtained from the first imaging unit 25, the second imaging unit 26 as well as on the sample profile of the skin and/or fat side 7, stored in the data storage unit 30, the profile of the skin and/or fat side 7 of the carcass part 2 being conveyed to the trimming device 12A is estimated.

The controller 28 controls the actuators 31, 32 to tilt all or some of the tiltable blade holder segments 38 to 41 to cut the skin and/or fat side 7 into the predetermined shape. The inclination angle α, β can be adjusted stepless. By tilting the tiltable blade holder segments 38 to 41, the geometry of the blade 34A and thus the cutting edge 35A changes. In particular, a curvature of the cutting edge 35A changes or is amended by tilting the tiltable blade holder segments 38 to 41.

As soon as the cutting starts, the sheet 23 is guided into the gap 22 where the tooth roll 13 grips the sheet 23, in particular the skin 6, and thus pulls the sheet 23 downwards away from the carcass part 2. In particular, the tooth roll 13 grips the sheet 23 along the entire width of the non-tiltable blade holder segment 37 but not along the entire width of the tiltable blade holder segments 38 to 41.

After tilting the tiltable blade holder segments 38 to 41 into a defined position between the untilted position P1 and the tilted position P2, the tiltable blade holder segments 38 to 41 can be left in this defined position until the carcass part 2 is trimmed along the whole length direction 9. This defined position of the tiltable blade holder segments 38 to 41 can be left static or unchanged for the whole batch of carcass parts 2. Alternatively, the position of the tiltable blade holder segments 38 to 41 can be adjusted individually for each carcass part 2 based on the data retrieved from the imaging device 24.

Alternatively, the position of the tiltable blade holder segments 38 to 41 can be adjusted dynamically. "Dynamically" in this context means that the position, or in other words the inclination angle α, β, of the tiltable blade holder segments 38 to 41 is adjusted or manipulated during the trimming of the carcass part 2. The key processing parameter for the dynamic adjustment of the tiltable blade holder segments 38 to 41 is the side profile 11 that can be obtained by the second imaging unit 26.

Figure 12:
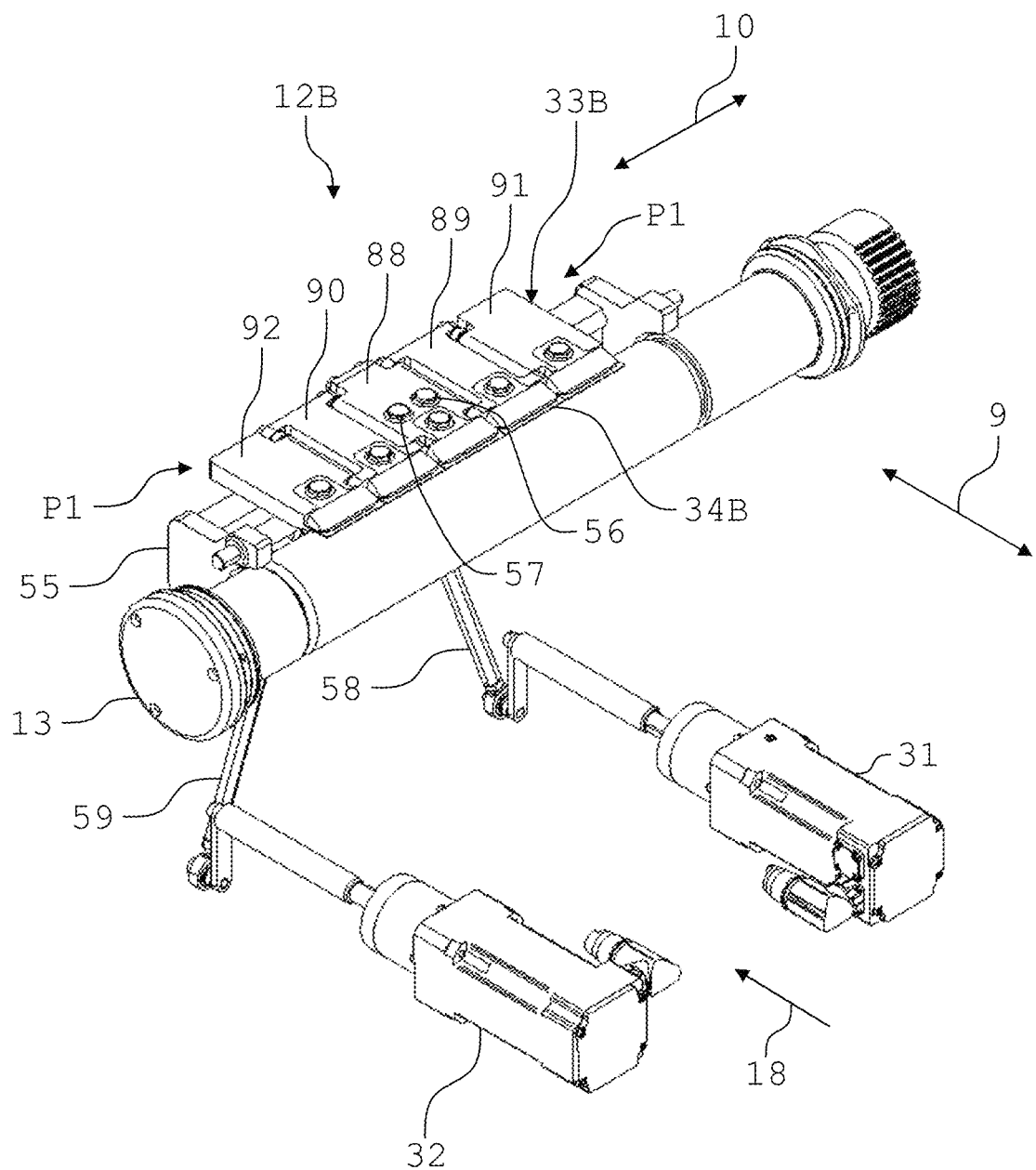
FIG. 12 shows a schematic perspective view of another embodiment of a trimming device for the trimming system according to FIG. 1.
Figure 13:
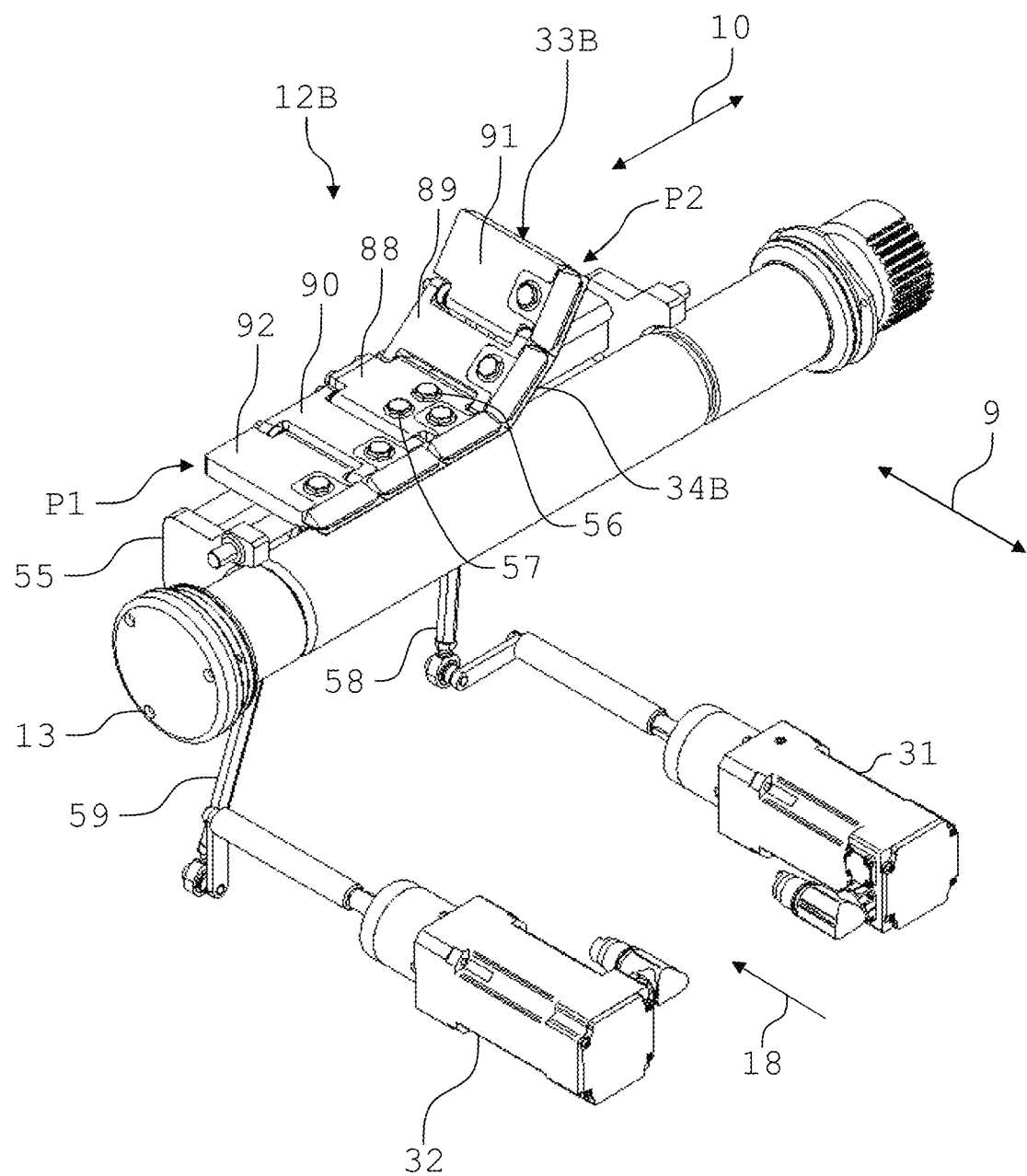
FIG. 13 shows a further schematic perspective view of the trimming device according to FIG. 12.
Figure 14:
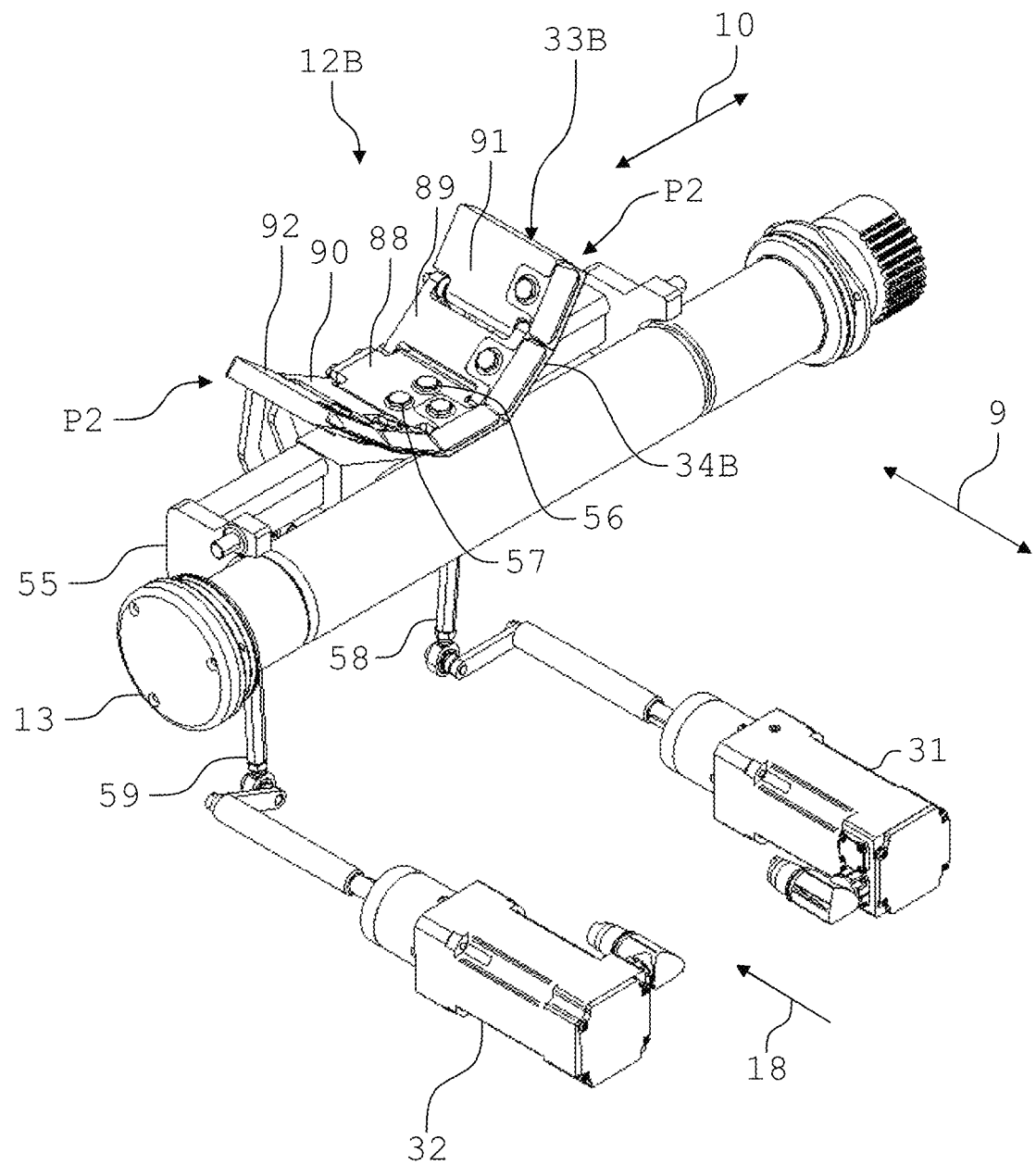
FIG. 14 shows a further schematic perspective view of the trimming device according to FIG. 12.

FIGS. 12 to 14 show perspective views of another embodiment of a trimming device 12B for the trimming system 1. FIGS. 15 to 19 show different perspective views of another embodiment of a blade holder 33B for the trimming device 12B. In the following, FIGS. 12 to 19 will be referred to at the same time.

Essentially, the trimming device 12B differs from the trimming device 12A only in an alternative embodiment of the blade holder 33B holding a segmented blade 34B instead of a continuous blade 34B as explained before. In the following, only differences between the embodiments of the trimming device 12A, 12B will be explained.

The blade holder 33B is actuated by means of actuators 31, 32 that are coupled to the blade holder 33B by means of tilting mechanisms 58, 59 as explained in context of the trimming device 12A. The actuators 31, 32 can be attached to a frame structure 55 as mentioned before. The blade holder 33B is designed to hold a segmented blade 34B. "Segmented" in this context means that the blade 34B is segmented and comprises a plurality of blade segments 82, 83 of which only two are provided with reference signs in FIGS. 15 and 16. The blade segments 82, 83 are not connected to each other. However, this does not exclude that the blade segments 82, 83 touch or contact each other. There can also be provided a gap between the neighboring blade segments 82, 83. The trimming device 12B can comprise a tooth roll 13 as explained before.

Each blade segment 82, 83 comprises a blade segment cutting edge 84, 85. All blade segment cutting edges 84, 85 together form a cutting edge 35B of the blade 34B. However, in contrast to the cutting edge 35A of the blade 34A, the cutting edge 35B is segmented. The cutting edge 35B can thus be named segmented cutting edge or discontinuous cutting edge. The sharp cutting edge 35B comprising the plurality of blade segment cutting edges 84, 85 faces the front face 3 of the carcass part 2 during operation of the trimming system 1. A blade back 86, 87 of each blade segment 82, 83 faces away from the blade segment cutting edges 84, 85. The blade backs 86, 87 are supported by the blade holder 33A along a length of the blade 34B.

Figure 17:
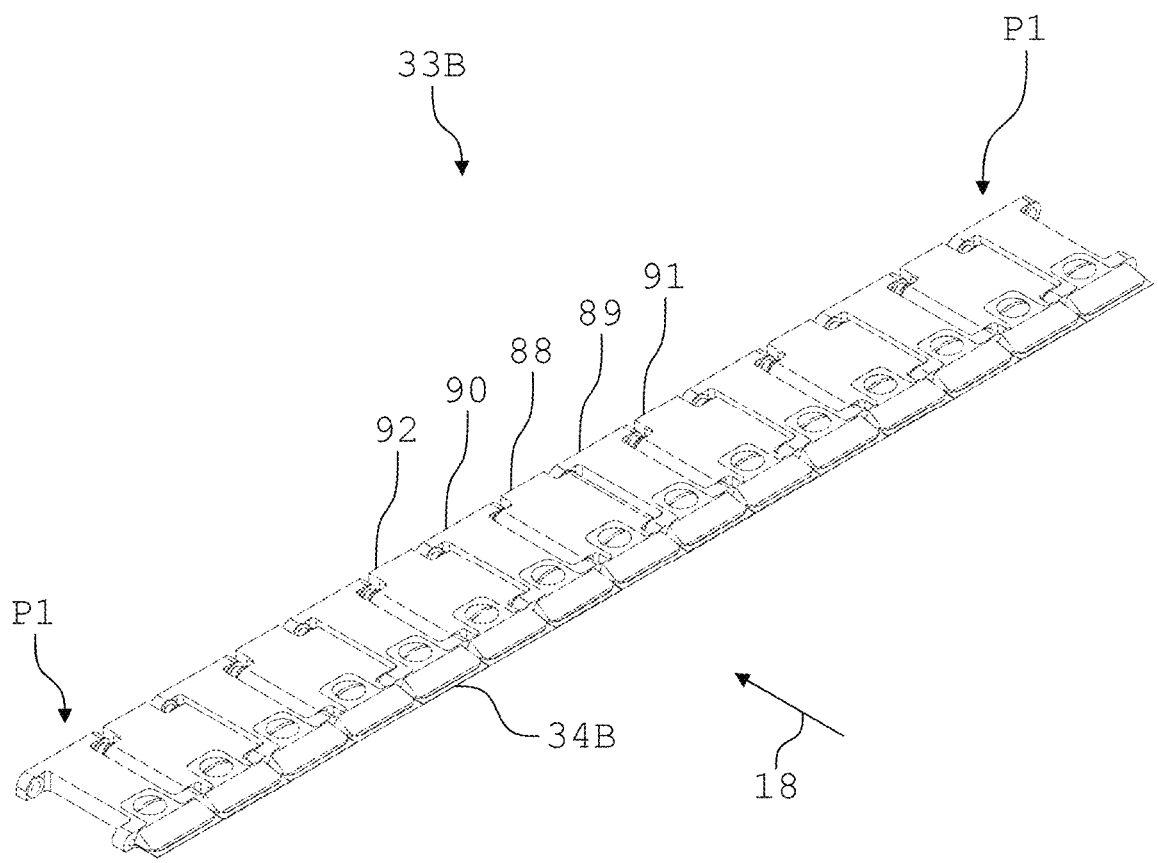
FIG. 17 shows a further schematic perspective view of the blade holder according to FIG. 15.
Figure 18:
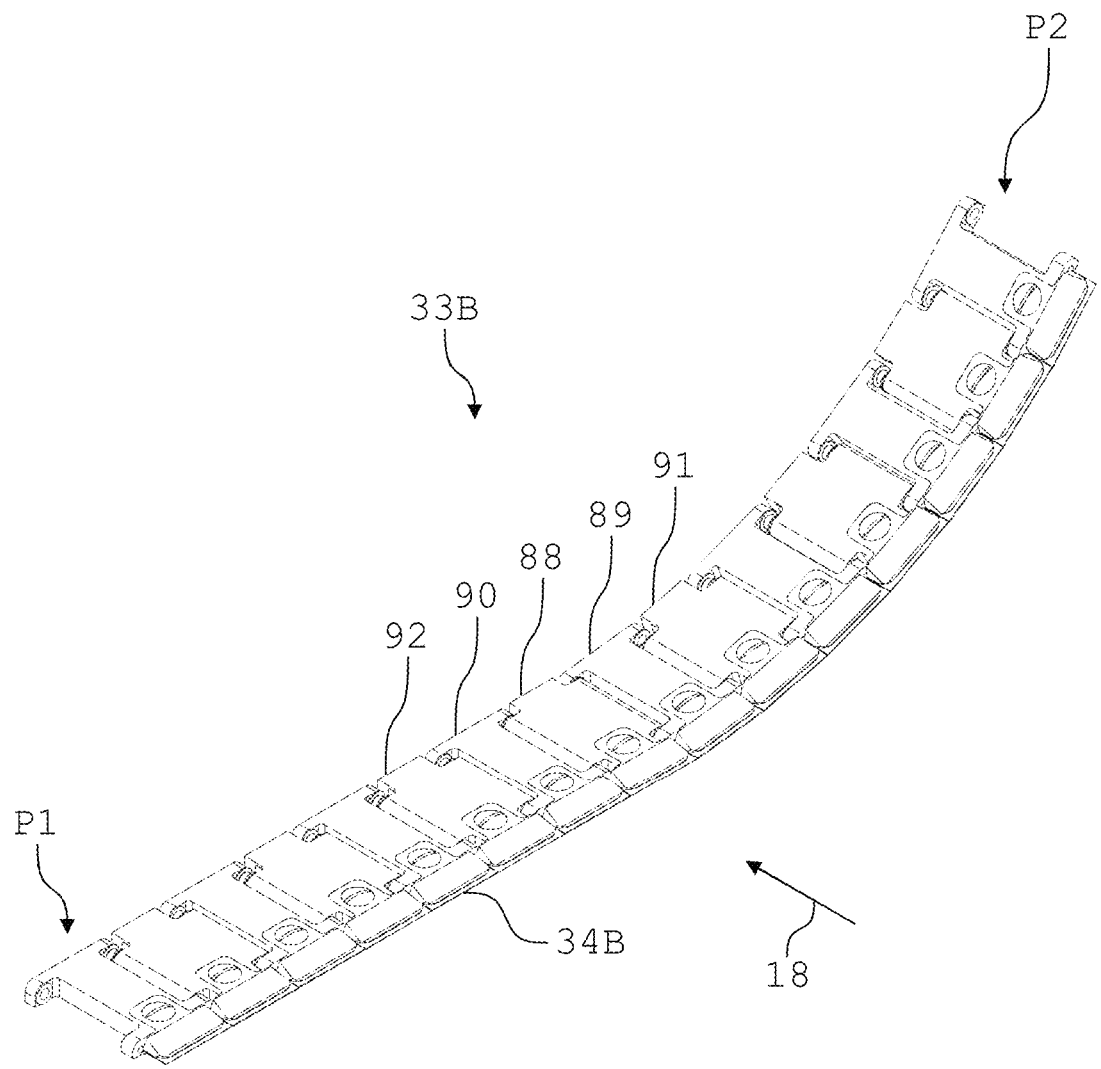
FIG. 18 shows a further schematic perspective view of the blade holder according to FIG. 15.
Figure 19:
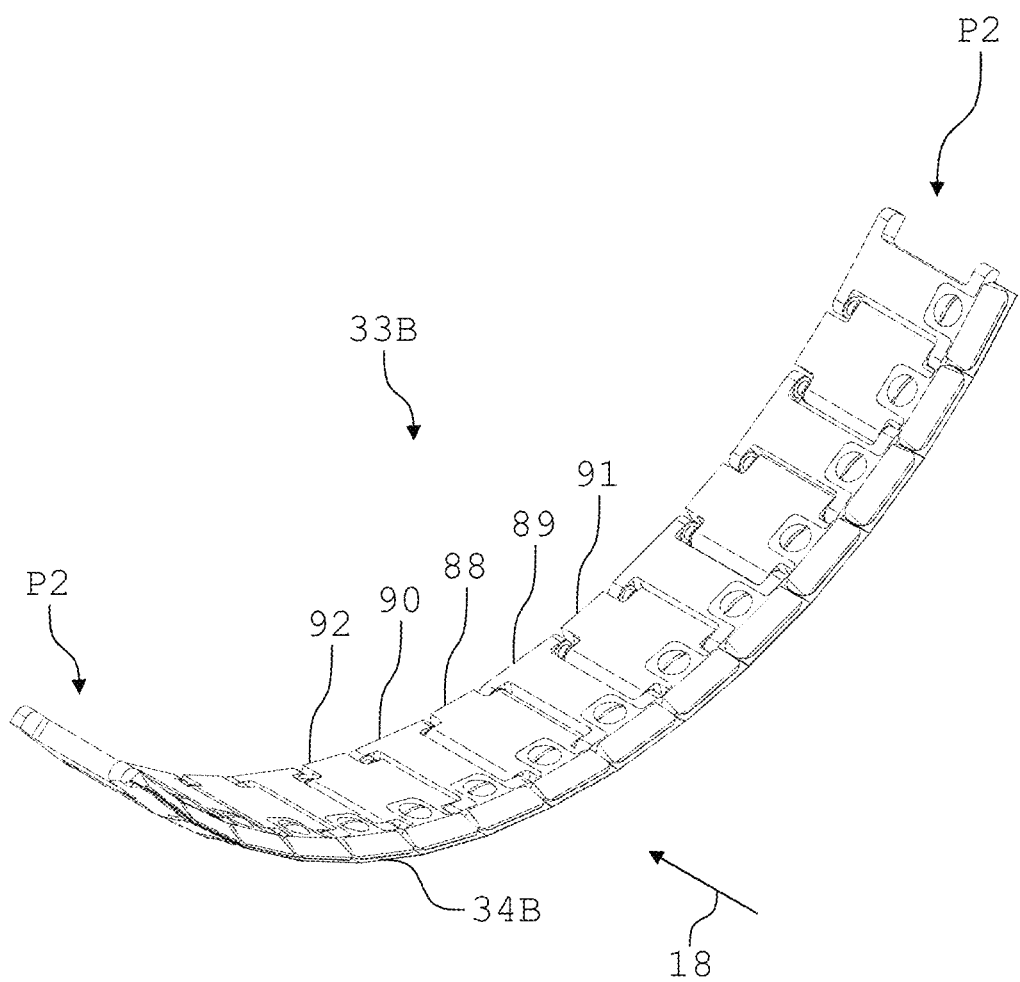
FIG. 19 shows a further schematic perspective view of the blade holder according to FIG. 15.

The blade holder 33B is segmented into a plurality of blade holder segments 88 to 92 of which only five are provided with reference signs in FIGS. 17 to 19. The number of blade holder segments 88 to 92 is arbitrary. There can be provided fifteen blade holder segments 88 to 92 as shown in FIGS. 17 and 19. However, there can also be provided seven, nine, eleven or even more than fifteen blade holder segments 88 to 92.

The blade holder 33B has a fixed or non-tiltable blade holder segment 88 that is arranged in the middle of the blade holder segments 89 to 92. The terms "fixed" and "non-tiltable" have been explained before regarding the non-tiltable blade holder segment 37 of the blade holder 33A. The explanations concerning the non-tiltable blade holder segment 37 are applicable to the non-tiltable blade holder segment 88 accordingly. The blade holder segments 89 to 92 can be tilted or pivoted in relation to the non-tiltable blade holder segment 88. For this reason, the blade holder segments 89 to 92 can be named tiltable blade holder segments.

The non-tiltable blade holder segment 88 can be attached to the shoe plate 21 as mentioned before. When the shoe plate 21 is moved or tilted, the non-tiltable blade holder segment 88 is moved or tilted together with the shoe plate 21. Thus, the whole blade holder 33B can be moved or tilted together with the shoe plate 21. The shoe plate 21 can be part of the trimming device 12B. The frame structure 55 carries the shoe plate 21 and/or the blade holder 33B. The non-tiltable blade holder segment 88 can be attached to the shoe plate 21 or the frame 55 by means of bolts 56, 57.

Figure 15:
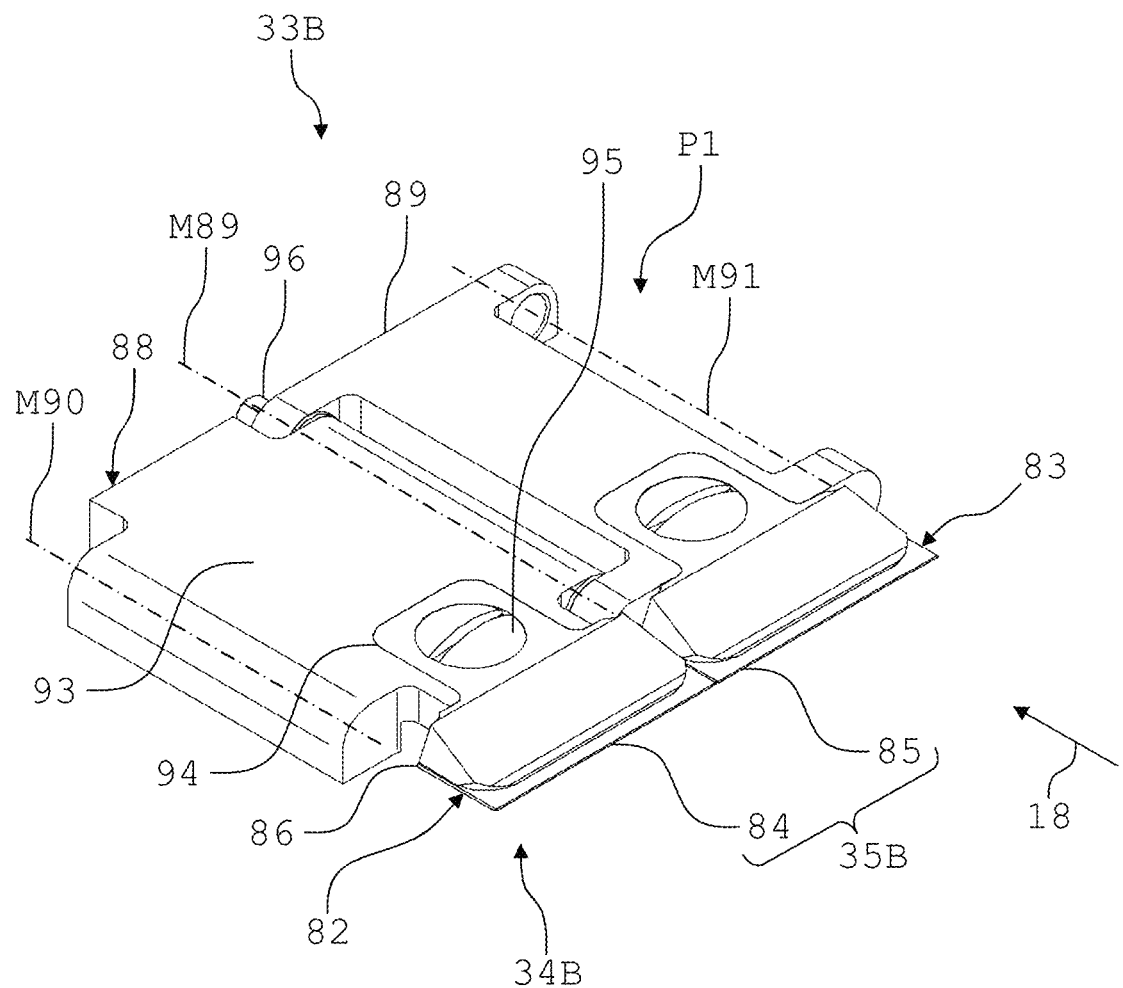
FIG. 15 shows a schematic perspective view of one embodiment of a blade holder for the trimming device according to FIG. 12.
Figure 16:
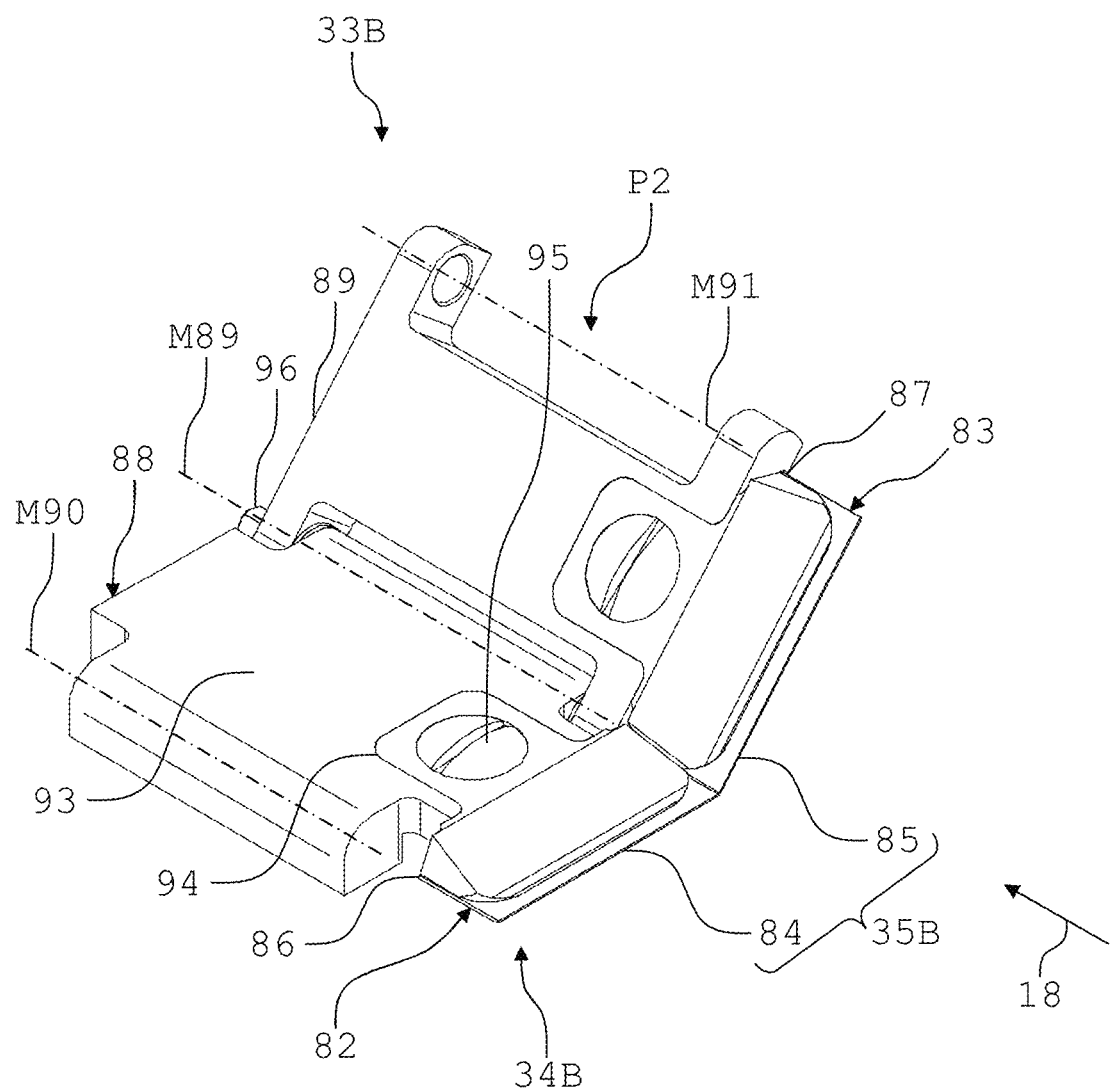
FIG. 16 shows a further schematic perspective view of the blade holder according to FIG. 15.

Each blade holder segment 88 to 92 comprises a base body 93 and a clamp element 94 that is connected to the base body 93 by means of a fastener 95 (FIGS. 15 and 16). The fastener 95 can be a bolt or a screw. The blade segments 82, 83 are clamped between the base body 93 and the clamp element 94 of each blade holder segment 88 to 92. Thus, each blade segment 82, 83 can be exchanged individually. Exchanging blade segments 82, 83 can be necessary due to wear of the blade segment cutting edges 84, 85.

The non-tiltable blade holder segment 88 is sandwiched between two first tiltable blade holder segments 89, 90. The non-tiltable blade holder segment 88 and the two first tiltable blade holder segments 89, 90 are sandwiched between two second tiltable blade holder segments 91, 92. The first tiltable blade holder segment 89 is rotatably supported at the non-tiltable blade holder segment 88 around an axis of rotation M89 (FIGS. 15 and 16). The first tiltable blade holder segment 90 is rotatably supported at the non-tiltable blade holder segment 88 around an axis of rotation M90. The second tiltable blade holder segment 91 is rotatably supported at the first tiltable blade holder segment 89 around an axis of rotation M91.

In this way, each tiltable blade holder segment 89 to 92 is rotatable or tiltable around a corresponding axis of rotation M89, M90, M91. Each tiltable blade holder segment 89 to 92 has at least one axis of rotation M89, M90, M91. Apart from the first tiltable blade holder segments 89, 90 and the second tiltable blade holder segments 91, 92, there can be provided a pair of third tiltable blade holder segments, a pair of fourth tiltable blade holder segments and so on.

Each axis of rotation M89, M90, M91 is oriented parallel to the conveying direction 18 or the length direction 9, respectively. "Parallel" in this context means that there is an angle of preferably 0°±10°, more preferably of 0°±5°, more preferably of 0°±3°, more preferably of 0° #1°, more preferably of exactly 0°, between the axis of rotation M89, M90, M91 and the conveying direction 18 or the length direction 9.

Accordingly, each axis of rotation M89, M90, M91 is oriented perpendicular to the cutting edge 35B or the blade segment cutting edges 84, 85. "Perpendicular" in this context can mean that there is an angle of preferably 90°±10°, more preferably of 90°±5°, more preferably of 90°±3°, more preferably of 90°±1°, more preferably of exactly 90°, between the axis of rotation M89, M90, M91 and the cutting edge 35B or the blade segment cutting edges 84, 85.

A bolt 96 of which only one is shown in FIGS. 15 and 16 can be assigned to each axis of rotation M89, M90, M91. By means of the bolt 96, the first tiltable blade holder segment 89 is rotatably attached to the non-tiltable blade holder segment 88. Each blade holder segment 88 to 92 has at least one bolt 96. Preferably, each blade holder segment 88 to 92 has two bolts 96. The non-tiltable blade holder segment 88 can be made of metal, for example, of aluminum or stainless steel. The tiltable blade holder segments 89 to 92 can also be made of metal, for example of aluminum or stainless steel.

The tiltable blade holder segments 89 to 92 can be moved from an untilted position P1 into a tilted position P2 and vice versa by means of the actuators 31, 32. The tiltable blade holder segments 89 to 92 can be steplessly adjusted between the untilted position P1 and the tilted position P2 in a plurality of intermediate positions (not shown).

Thus, the geometry of the cutting edge 35B changes when the tiltable blade holder segments 89 to 92 are brought from the untilted position P1 into the tilted position P2 and vice versa. "Geometry" in this context can mean a curvature of the cutting edge 35B. In other words, the curvature of the cutting edge 35B changes when bringing the tiltable blade holder segments 89 to 92 from the untilted position P1 into the tilted position P2 and vice versa. "Curvature" does not exclude that the blade segment cutting edges 84, 85 themselves are not deformed or bent.

By means of each tilting mechanism 58, 59 at least two of the tiltable blade holder segments 89 to 92 can be actuated. However, each tilting mechanism 58, 59 can actuate more than two tiltable blade holder segments 89 to 92. "Actuated" in this context means that the tiltable blade holder segments 89 to 92 can be moved from the untilted position P1 into the tilted position P2 and vice versa. The first tilting mechanism 58 actuates the tiltable blade holder segments 89, 91. The second tilting mechanism 59 actuates the tiltable blade holder segments 90, 92. Alternatively, each tiltable blade holder segment 89 to 92 can have its own actuator 31, 32. In this case, more than two actuators 31, 32 are provided.

By actuating the first tilting mechanisms 58 by means of the first actuator 31, the tiltable blade holder segments 89, 91 can be tilted or pivoted together from the untilted position P1 into the tilted position P2 and vice versa. By actuating the second tilting mechanisms 59 by means of the second actuator 32, the tiltable blade holder segments 90, 92 can be tilted or pivoted together from the untilted position P1 into the tilted position P2 and vice versa. Thus, the tiltable blade holder segments 89, 91 and the tiltable blade holder segments 90, 92 can be moved from the untilted position P1 into the tilted position P2 and vice versa independently from each other.

In the tilted position P2, an inclination angle between the non-tiltable blade holder segment 88 and the inclined tiltable blade holder segments 89 to 92 is smaller than in the untilted position P1. In the untilted position P1, the non-tiltable blade holder segment 88 and the tiltable blade holder segments 89 to 92 are arranged parallel to each other. Thus, in the untilted position P1, the inclination angle has a value of 180°. By means of the actuators 31, 32, the inclination angle can be adjusted stepless.

The functionality of the trimming device 12B is the same as the functionality of the trimming device 12A. The only difference is that the trimming device 12B has a segmented blade 34B instead of a continuous blade 34A as the trimming device 12A has.

Figure 20:
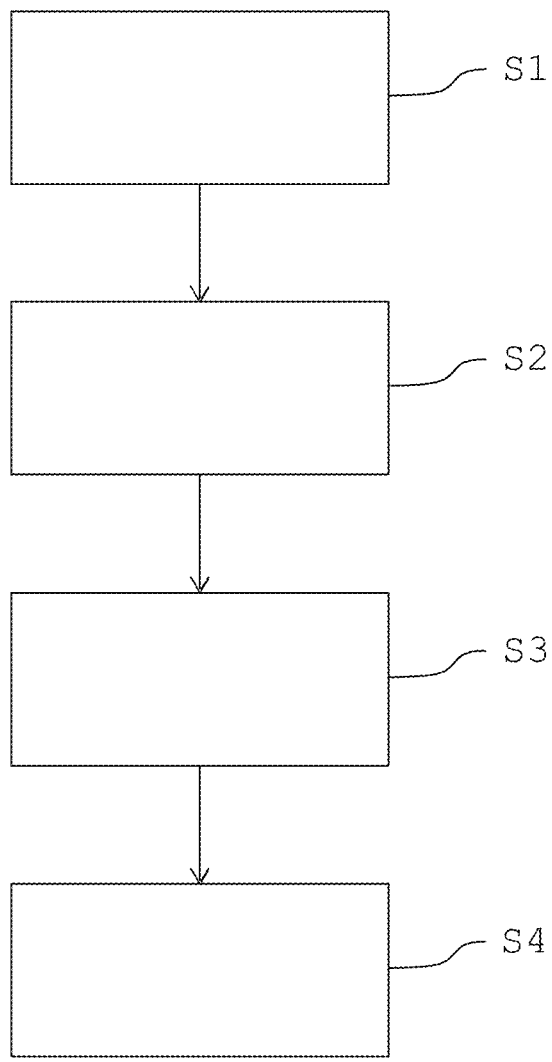
FIG. 20 shows a flowchart of one embodiment of a method for trimming a carcass part having a skin and/or fat side.

FIG. 20 shows a flowchart of one embodiment of a method for trimming the carcass part 2. The method is performed by means of the trimming system 1 and/or the trimming device 12A, 12B.

In a step S1 of the method, the carcass part 2 is conveyed to the trimming device 12A, 12B so that the front face 3 faces the cutting edge 35A, 35B of the blade 34A, 34B. The conveying action can be carried out by means of the conveyor 14. In a step S2, the tiltable blade holder segments 38 to 41, 89 to 92 are tilted by means of the actuators 31, 32 based on information concerning the profile of the skin and/or fat side 7. Obtaining this information has been explained in detail before.

In a step S3, the geometry the cutting edge 35A, 35B is changed. This can for example be done by elastically deforming the cutting edge 35A by means of the tilted tiltable blade holder segments 38 to 41. The tiltable blade holder segments 38 to 41 can be moved in any needed position between the untilted position P1 and the tilted position P2.

Alternatively, the change in geometry of the cutting edge 35B can be done by tilting the tiltable blade holder segments 89 to 92 together with the blade segments 82, 83. In this case, the blade segments 82, 83 are not bent or deformed. However, an inclination of the blade segments 82, 83 in relation to each other is changed or amended to alter the geometry of the cutting edge 35B. The tilting can be static or dynamic, as explained before. In a step S4, the skin and/or fat side 7 is trimmed or cut into the predetermined shape by means of the blade 34A, 34B.

During step S1, the imaging device 24 obtains the side profile 11 of the skin and/or fat side 7 from the captured image of the surface thereof. The image of the front face 3 of the carcass part 2, the side profile 11 of the skin and/or fat side 7 and the sample data are combined to the information concerning the profile of the skin and/or fat side 7 being used to actuate the actuators 31, 32. The sample data can be obtained as explained before by cutting a sample carcass part 2 subsequently into slices.

Before step S1, an initial height of the trimming device 12A, 12B towards the tooth roll 13 is adjusted. The trimming device 12A, 12B is thus adjusted in the y-direction y as explained before. The trimming device 12A, 12B can also be moved along the x-direction x and/or the z-direction z for adjustment. Additionally, the trimming device 12A, 12B can be tilted or rotated around the x-direction x, the y-direction y and/or the z-direction z for adjustment purposes. An actuator or several actuators can be provided for this movement.

During step S4, the tooth roll 13 grips the sheet 23 that has been trimmed off the skin and/or fat side 7. As mentioned before, the sheet 23 comprises the skin 6 and a part of the fat layer 5. The sheet 23 is gripped along the entire width of the non-tiltable blade holder segment 37, 88 but is not gripped along the entire width of the tiltable blade holder segments 38 to 41, 89 to 92. However, the blade 34A, 34B trims the skin and/or fat side 7 along the whole width of the non-tiltable blade holder segment 37 and the whole width of the tiltable blade holder segments 38 to 41, 89 to 92.

Although the present invention has been described in accordance with preferred embodiments, it is obvious for the person skilled in the art that modifications are possible in all embodiments.

The invention claimed is:

1. A trimming device for trimming a carcass part having a skin and/or fat side, comprising
   a blade having a cutting edge facing a front face of the carcass part,
   a blade holder for holding the blade,
   wherein the blade holder comprises a tiltable blade holder segment and a non-tiltable blade holder segment,
   wherein the tiltable blade holder segment is rotatably coupled to the non-tiltable blade holder segment around an axis of rotation,
   wherein the axis of rotation is oriented parallel to a conveying direction along which the carcass part is transported to the trimming device, and
   an actuator that is configured to tilt the tiltable blade holder segment relative to the non-tiltable blade holder segment based on information concerning a profile of the skin and/or fat side,
   wherein a geometry of the cutting edge changes when the tiltable blade holder segment is tilted relative to the non-tiltable blade holder segment by means of the actuator to trim the skin and/or fat side into a predetermined shape.

2. The trimming device according to claim 1, wherein the blade is a continuous blade, and wherein the cutting edge is elastically deformed when the tiltable blade holder segment is tilted relative to the non-tiltable blade holder segment by means of the actuator.

3. The trimming device according to claim 1, wherein the blade comprises a plurality of blade segments, and
   wherein the non-tiltable blade holder segment and the tiltable blade holder segment each hold their own blade segment.

4. The trimming device according to claim 1, wherein the blade comprises a blade back that faces away from the cutting edge, and
   wherein the blade holder supports the blade back along its length.

5. The trimming device according to claim 1, wherein the tiltable blade holder segment is tiltable relatively to the non-tiltable blade holder segment from an untilted position into a tilted position, and
   wherein an inclination angle ($\alpha$) between the non-tiltable blade holder segment and the tiltable blade holder segment is smaller in the tilted position than in the untilted position.

6. The trimming device according to claim 1, wherein the blade is only firmly attached to the non-tiltable blade holder segment.

7. The trimming device according to claim 1, wherein the blade holder comprises two tiltable blade holder segments that are rotatably coupled to the non-tiltable blade holder segment, and
   wherein the non-tiltable blade holder segment is arranged in between the two tiltable blade holder segments.

8. The trimming device according to claim 1, wherein the blade holder comprises a first tiltable blade holder segment and a second tiltable blade holder segment,
   wherein the first tiltable blade holder segment is rotatably coupled to the second tiltable blade holder segment, and
   wherein the first tiltable blade holder segment is rotatably coupled to the non-tiltable blade holder segment.

9. The trimming device according to claim 8, further comprising a tilting mechanism that couples the first tiltable blade holder segment to the second tiltable blade holder segment,
   wherein the actuator is configured to actuate the tilting mechanism to tilt the first tiltable blade holder segment and the second tiltable blade holder segment in a coupled movement, and
   wherein both the first tiltable blade holder segment and the second tiltable blade holder segment change the geometry of the cutting edge when being tilted by means of the tilting mechanism to trim the skin and/or fat side into the predetermined shape.

10. The trimming device according to claim 1, wherein the actuator is configured to dynamically tilt the tiltable blade holder segment based on the information concerning the profile of the skin and/or fat side while trimming the skin and/or fat side into the predetermined shape.

11. A trimming system for trimming a carcass part having a skin and/or fat side, comprising
    a trimming device according to claim 1, and
    an imaging device for capturing information concerning the profile of the skin and/or fat side by scanning the carcass part.

12. The trimming system according to claim 11, wherein the imaging device comprises one or more of the following imaging units:
    an imaging unit for capturing an image of the front face of the carcass part facing the cutting edge,
    an imaging unit for capturing an image of a surface of the skin and/or fat side,
    an imaging unit for directly capturing the profile of the skin and/or fat side.

13. The trimming system according to claim 11, further comprising a conveyor for conveying the carcass part to the trimming device along the conveying direction,
    wherein the skin and/or fat side is facing downwards to the conveyor,
    a drive roll for holding the carcass part down during the trimming thereof,
    a tooth roll for gripping a sheet of the skin and/or fat side that has been trimmed off the skin and/or fat side, and/or
    a shoe plate that guides the sheet away from the trimming device.

14. The trimming system according to claim 13, wherein the tooth roll comprises a plurality of teeth that are designed to grip the sheet of the skin and/or fat side that has been trimmed off the skin and/or fat side.

15. A method for trimming a carcass part having a skin and/or fat side by means of a trimming device for trimming the carcass part, wherein the trimming device comprises a blade having a cutting edge, a blade holder for holding the blade, wherein the blade holder comprises a tiltable blade holder segment and a non-tiltable blade holder segment, wherein the tiltable blade holder segment is rotatably coupled to the non-tiltable blade holder segment around an axis of rotation, wherein the axis of rotation is oriented parallel to a conveying direction along which the carcass part is transported to the trimming device, and an actuator that is configured to tilt the tiltable blade holder segment relative to the non-tiltable blade holder segment, the method comprising the following steps:

a) conveying the carcass part to the trimming device along the conveying direction so that a front face of the carcass part faces the cutting edge, b) tilting the tiltable blade holder segment relative to the non-tiltable blade holder segment by means of the actuator based on information concerning a profile of the skin and/or fat side, c) changing a geometry of the cutting edge by means of the tiltable blade holder segment being tilted relative to the non-tiltable blade holder segment, and d) trimming the skin and/or fat side into a predetermined shape.

16. The method according to claim 15, wherein the tiltable blade holder segment is dynamically tilted based on the information concerning the profile of the skin and/or fat side while trimming the skin and/or fat side into the predetermined shape.

* * * * *